US012626356B2

(12) United States Patent
Bal et al.

(10) Patent No.: US 12,626,356 B2
(45) Date of Patent: May 12, 2026

(54) CORESET BASED MASK INSPECTION FOR SEMICONDUCTOR SPECIMEN FABRICATION

(71) Applicant: Applied Materials Israel Ltd., Rehovot (IL)

(72) Inventors: Evgeny Bal, Natanya (IL); Ariel Shkalim, DN Sede Gat (IL); Vladimir Ovechkin, Ashdod (IL); Simion Kurin, Beaverton, OR (US)

(73) Assignee: Applied Materials Israel Ltd., Rehovot (IL)

( * ) Notice: Subject to any disclaimer, the term of this patent is extended or adjusted under 35 U.S.C. 154(b) by 213 days.

(21) Appl. No.: 18/415,568

(22) Filed: Jan. 17, 2024

(65) Prior Publication Data

US 2025/0232431 A1     Jul. 17, 2025

(51) Int. Cl.
*G06T 7/00* (2017.01)
*G06T 7/13* (2017.01)

(52) U.S. Cl.
CPC .............. G06T 7/001 (2013.01); G06T 7/13 (2017.01); *G06T 2207/10061* (2013.01); *G06T 2207/30148* (2013.01)

(58) Field of Classification Search
CPC . G06T 7/001; G06T 7/13; G06T 2207/10061; G06T 2207/30148; G06T 7/0004; G06V 10/25; G06V 10/44; G06V 10/761; G06V 10/764; G03F 1/84
See application file for complete search history.

(56) References Cited

U.S. PATENT DOCUMENTS

| | | | | |
|---|---|---|---|---|
| 7,570,797 B1 * | 8/2009 | Wang | ...................... | G06F 18/40 356/237.4 |
| 11,526,800 B2 * | 12/2022 | Srivatsa | ................. | G06N 20/00 |
| 2009/0287440 A1 * | 11/2009 | Kulkarni | .......... | G05B 19/41875 702/82 |
| 2023/0080151 A1 * | 3/2023 | Shkalim | ................ | G06T 7/0006 382/149 |

* cited by examiner

*Primary Examiner* — Wassim Mahrouka
(74) *Attorney, Agent, or Firm* — Lowenstein Sandler LLP

(57)     ABSTRACT

There is provided a system and method of a method of mask inspection, comprising: obtaining a plurality of aerial images of a mask; generating a plurality of image coresets corresponding to the aerial images, comprising, for each given aerial image: applying a printing threshold on the given aerial image to obtain a binary image representative of printable features thereof; extracting a contour for each feature of interest (FOI) from the printable features, and generating a descriptor characterizing the contour, giving rise to a group of contours associated with respective descriptors; and creating an image coreset for the group of contours based on the respective descriptors thereof, the image coreset comprising one or more families, each comprising at least one representative contour representing one or more similar contours of a respective type from the group of contours. The plurality of image coresets can be merged to obtain a mask coreset.

20 Claims, 11 Drawing Sheets

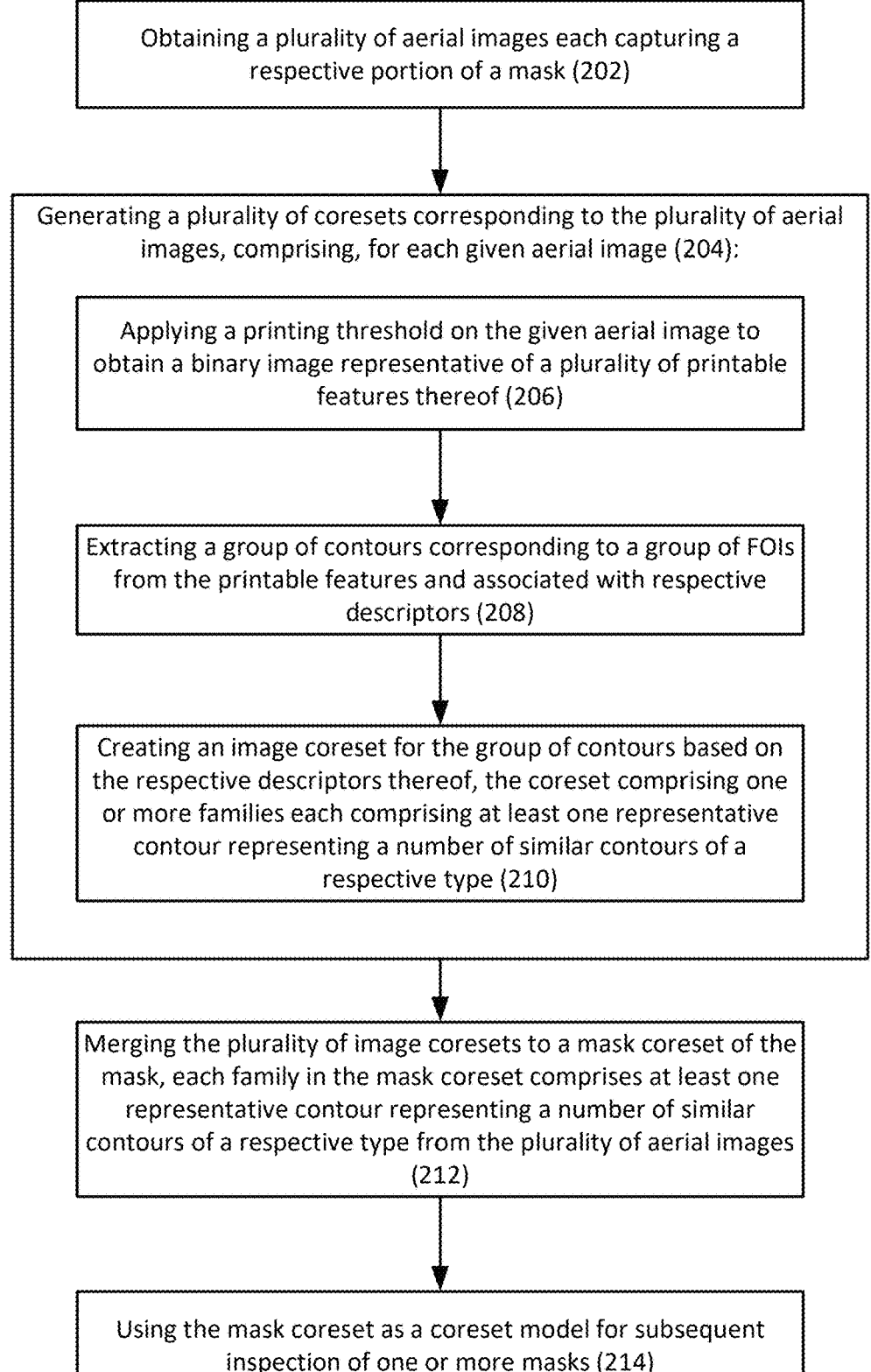

Obtaining a plurality of aerial images each capturing a respective portion of a mask (202)

Generating a plurality of coresets corresponding to the plurality of aerial images, comprising, for each given aerial image (204):

Applying a printing threshold on the given aerial image to obtain a binary image representative of a plurality of printable features thereof (206)

Extracting a group of contours corresponding to a group of FOIs from the printable features and associated with respective descriptors (208)

Creating an image coreset for the group of contours based on the respective descriptors thereof, the coreset comprising one or more families each comprising at least one representative contour representing a number of similar contours of a respective type (210)

Merging the plurality of image coresets to a mask coreset of the mask, each family in the mask coreset comprises at least one representative contour representing a number of similar contours of a respective type from the plurality of aerial images (212)

Using the mask coreset as a coreset model for subsequent inspection of one or more masks (214)

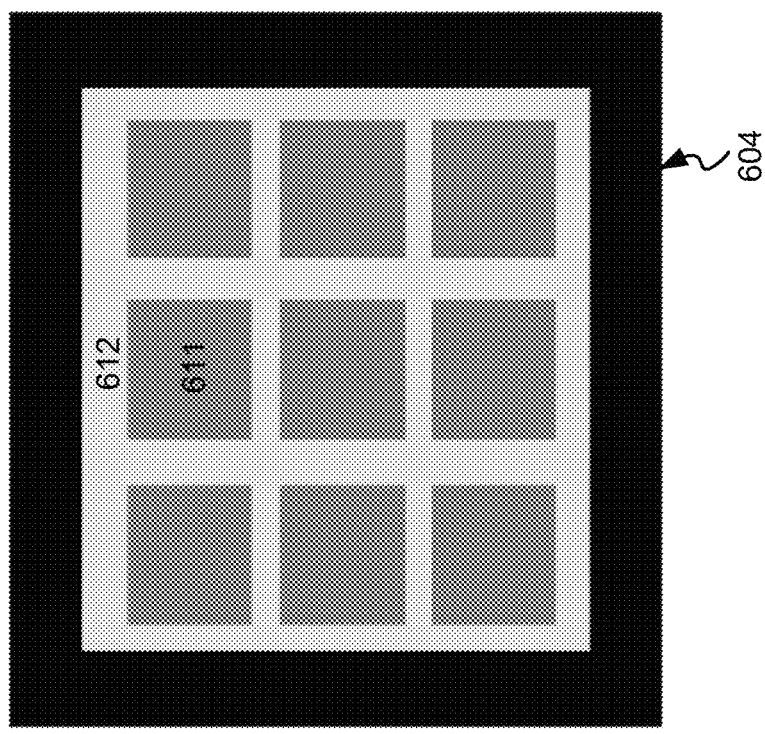
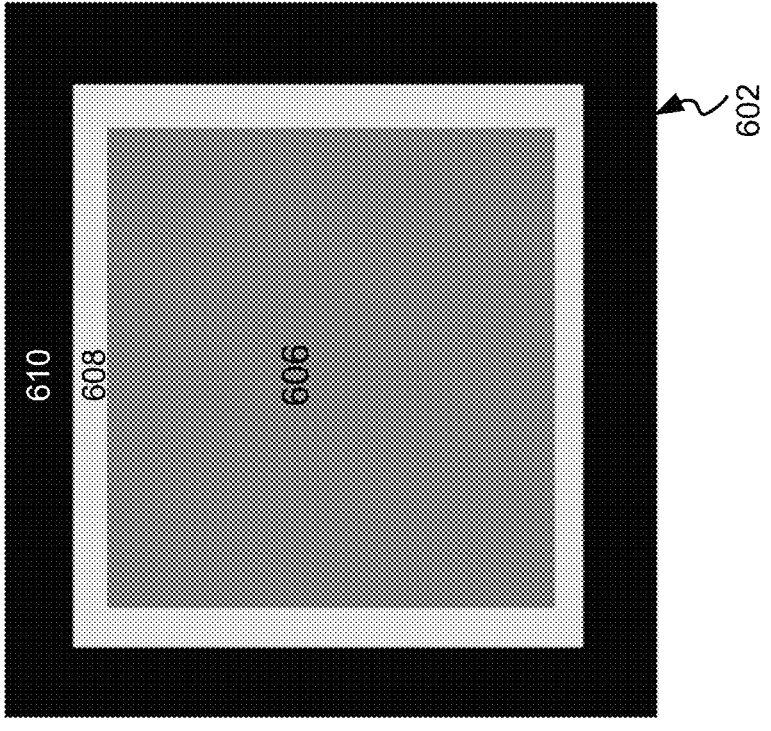
FIG. 6

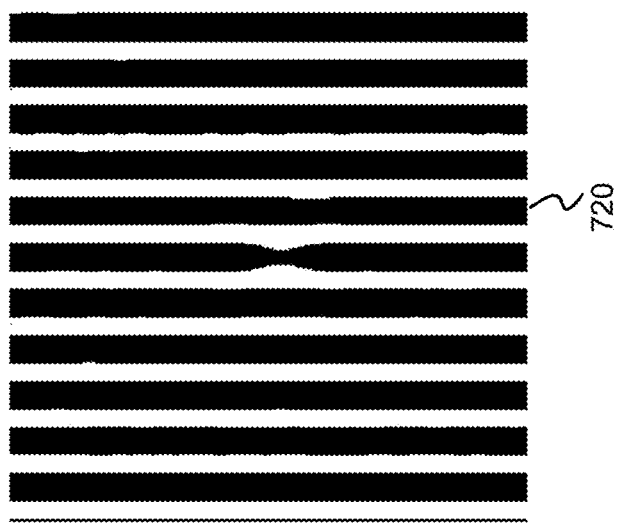
720
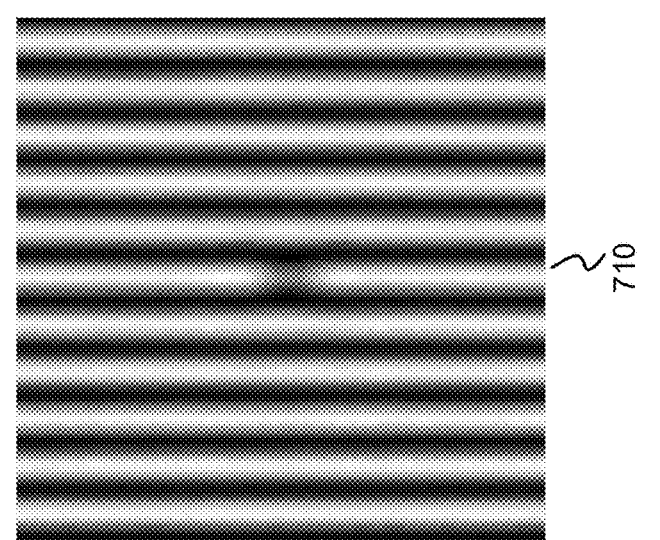
710
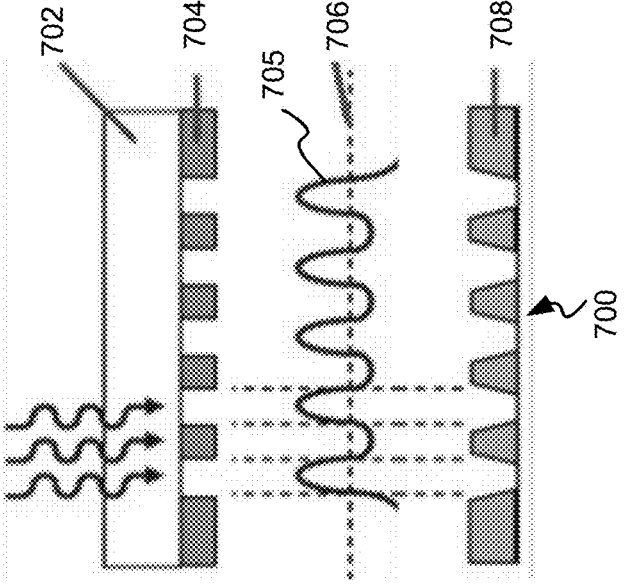
702
704
705
706
708
700
FIG. 7

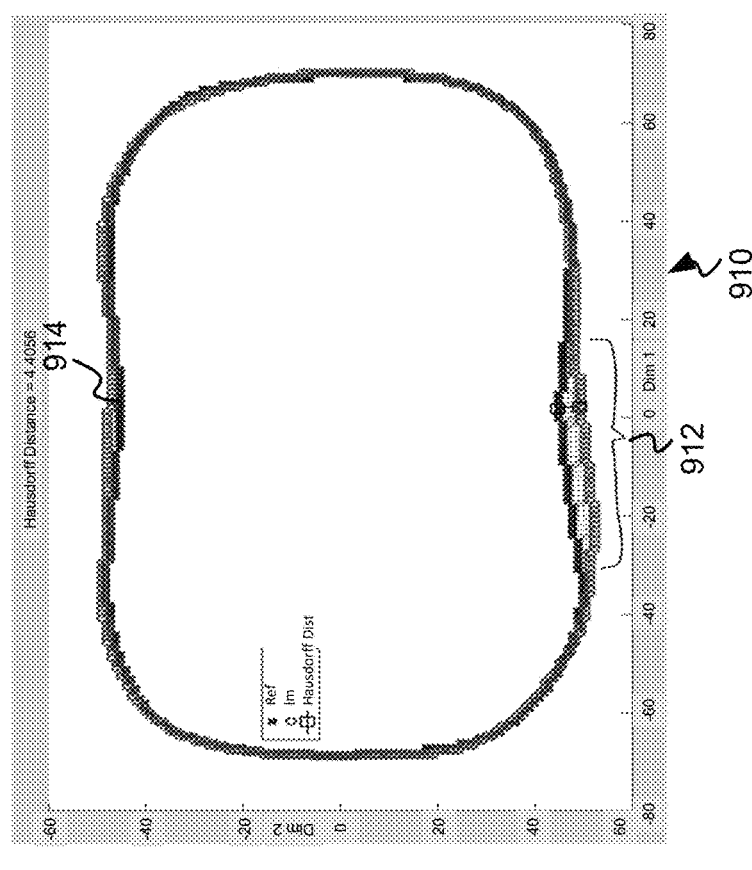
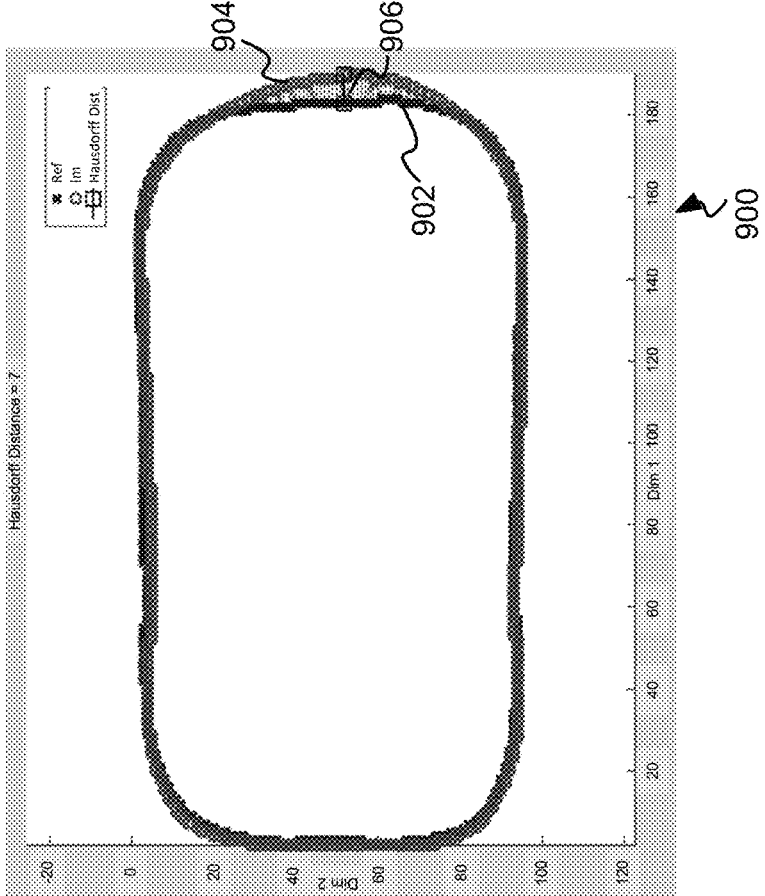
FIG. 9

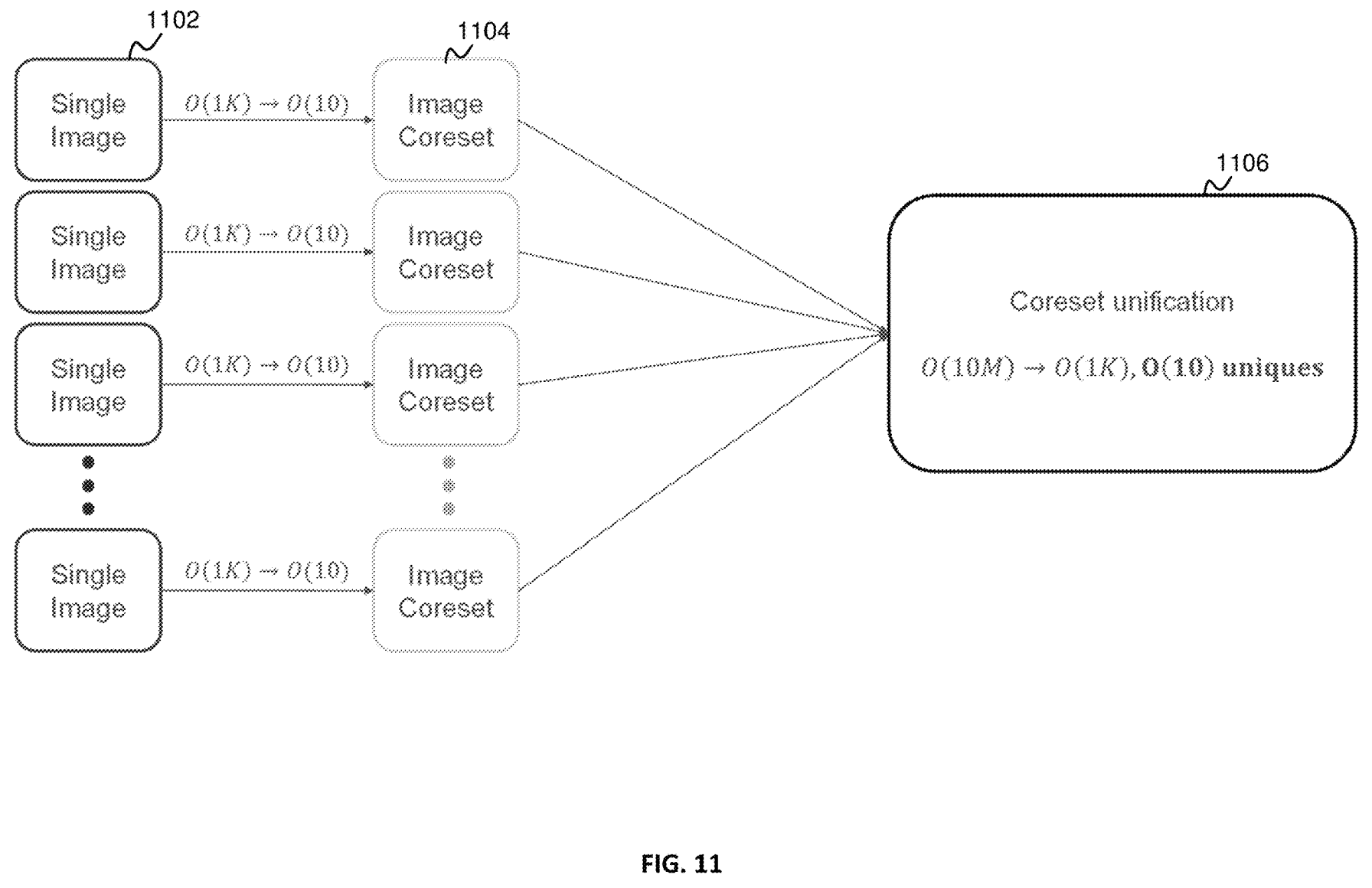

1106

Coreset unification $O(10M) \rightarrow O(1K)$, $O(10)$ uniques

1104

Image Coreset

Image Coreset

Image Coreset

Image Coreset

1102

$O(1K) \rightarrow O(10)$ $O(1K) \rightarrow O(10)$ $O(1K) \rightarrow O(10)$ $O(1K) \rightarrow O(10)$ Single Image Single Image Single Image Single Image

FIG. 11

CORESET BASED MASK INSPECTION FOR SEMICONDUCTOR SPECIMEN FABRICATION

TECHNICAL FIELD

The presently disclosed subject matter relates, in general, to the field of mask inspection, and more specifically, to defect detection with respect to a photomask.

BACKGROUND

Current demands for high density and performance associated with ultra large-scale integration of fabricated micro-electronic devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Semiconductor devices are often manufactured using photo lithographic masks (also referred to as photomasks or masks or reticles) in a photolithography process. The photolithography process is one of the principal processes in the manufacture of semiconductor devices, and comprises patterning a wafer's surface in accordance with the circuit design of the semiconductor devices to be produced. Such a circuit design is first patterned on a mask. Hence, in order to obtain operating semiconductor devices, the mask must be defect free. Masks are manufactured by a complex process and can suffer from various defects and variations.

In addition, the mask is often used in a repeated manner to create many dies on one or more wafers. Thus, any defect on the mask will be repeated multiple times on the wafers and will cause multiple devices to be defective. Establishing a production-worthy process requires tight control of the overall lithography process. Within this process, critical dimension (CD) control is a determining factor with respect to device performance and yield.

Various mask inspection methods have been developed and are available commercially. According to certain conventional techniques of designing and evaluating masks, the mask is created and used to expose therethrough a wafer, and then an inspection is performed to determine whether the features/patterns of the mask have been transferred to the wafer according to the design. Any variations in the final printed features from the intended design may necessitate modifying the design, repairing the mask, creating a new mask, and/or exposing a new wafer.

In this regard, verification of the accuracy and quality of the printed features permits an indirect method of verifying the mask. However, since the final printed pattern on the wafer or die is formed after the printing process, e.g., the resist development, the substrate treatment (such as material etching or deposition), etc., it may be difficult to attribute, discriminate, or isolate errors in the final printed pattern to problems associated with the mask and/or the resist deposition and/or the developing processes. Moreover, inspecting the final printed pattern on the wafer or die tends to offer a limited number of samples usable to detect, determine, and resolve any processing issues. This process may also be labor intensive and presents an extensive inspection and analysis time. Alternatively, a mask can be directly inspected using various mask inspection tools.

SUMMARY

In accordance with certain aspects of the presently disclosed subject matter, there is provided a computerized system of inspecting a mask usable for fabricating a semiconductor specimen, the system comprising one or more processing circuitries configured to: obtain a plurality of aerial images each capturing a respective portion of a mask; generate a plurality of image coresets corresponding to the plurality of aerial images, comprising, for each given aerial image: i) apply a printing threshold on the given aerial image to obtain a binary image representative of a plurality of printable features thereof; ii) extract a contour for each feature of interest (FOI) of a group of FOIs from the plurality of printable features, and generate a descriptor characterizing the contour, giving rise to a group of contours corresponding to the group of FOIs and associated with respective descriptors; and iii) create an image coreset for the group of contours based on the respective descriptors thereof, the image coreset comprising one or more families, each comprising at least one representative contour representing one or more similar contours of a respective type from the group of contours; and merge the plurality of image coresets to obtain a mask coreset, wherein the mask coreset comprises one or more families, each family comprising at least one representative contour representing one or more similar contours of a respective type from the plurality of aerial images, the at least one representative contour being indicated as normal or abnormal based on the number of the one or more similar contours of the respective type from the plurality of aerial images.

In addition to the above features, the system according to this aspect of the presently disclosed subject matter can comprise one or more of features (i) to (xiv) listed below, in any desired combination or permutation which is technically possible:

(i). For a family in the mask coreset that comprises at least one representative contour indicated as abnormal, the one or more processing circuitries can be further configured to identify one or more similar contours of a respective type represented by the at least one representative contour, and report one or more FOIs corresponding to the one or more similar contours of the respective type as one or more defect candidates.

(ii). A defect candidate from the one or more defect candidates can represent an edge displacement error indicative of a relatively substantial deviation of a contour of a FOI from an expected position thereof.

(iii). Each family in the image coreset can be associated with an indication whether the at least one representative contour thereof is indicated as normal or abnormal at an image level, the indication obtained based on the one or more similar contours of the respective type from the group of contours.

(iv). The image coreset can be a subset of representative contours that approximates a distribution of the group of contours.

(v). The one or more processing circuitries can be configured to create the image coreset by: initializing an image coreset; sequentially, for each given contour in the group of contours: searching in the image coreset for one or more reference contours based on a similarity measure applied on the descriptors thereof; in response to the one or more reference contours being identified, measuring a deviation between the given contour and each of the one or more reference contours; and determining whether to add the given contour to a family in the coreset based on the measured deviation.

(vi). In response to the one or more reference contours not being found, the one or more processing circuitries can be configured to add the given contour to a new family in the image coreset.

(vii). The one or more processing circuitries can be configured to measure the deviation between the given contour and each of the one or more reference contours by: registering the given contour respectively with the one or more reference contours, giving rise to one or more registered pairs of contours; measuring distances between corresponding points of each registered pair of contours; and calculating the deviation based on the measured distances.

(viii). The one or more processing circuitries can be configured to merge the plurality of image coresets by measuring deviation between representative contours from different image coresets of the plurality of image coresets, and keeping at least one representative contour in the mask coreset representing one or more similar contours of a same type.

(ix). The plurality of image coresets can be generated at least partially in parallel by multiple processors, and sent to a specific processor to be merged.

(x). The descriptor of a contour can be based on one or more of: an area formed by the contour, width of the area, height of the area, the number of pixels along the contour, a chain code, a center of gravity, and polar coordinates of the contour.

(xi). The plurality of aerial images can be sequentially acquired by an actinic mask inspection tool configured to emulate optical configuration of a lithographic tool.

(xii). The merging of the plurality of image coresets can enable to share contour statistics among the plurality of aerial images across the mask, thereby allowing to reduce false alarms and improving detection sensitivity.

(xiii). The mask coreset can be usable as a mask coreset model for subsequent inspection of one or more masks.

(xiv). The plurality of aerial images can be captured for a single-die mask or a multi-die mask.

In accordance with other aspects of the presently disclosed subject matter, there is provided a method of inspecting a mask usable for fabricating a semiconductor specimen, the method comprising: obtaining a plurality of aerial images each capturing a respective portion of a mask; generating a plurality of image coresets corresponding to the plurality of aerial images, comprising, for each given aerial image: i) applying a printing threshold on the given aerial image to obtain a binary image representative of a plurality of printable features thereof; ii) extracting a contour for each feature of interest (FOI) of a group of FOIs from the plurality of printable features, and generating a descriptor characterizing the contour, giving rise to a group of contours corresponding to the group of FOIs and associated with respective descriptors; and iii) creating an image coreset for the group of contours based on the respective descriptors thereof, the image coreset comprising one or more families each comprising at least one representative contour representing one or more similar contours of a respective type from the group of contours; and merging the plurality of image coresets to obtain a mask coreset, wherein each family in the mask coreset comprises at least one representative contour representing one or more similar contours of a respective type from the plurality of aerial images, the at least one representative contour being indicated as normal or abnormal based on the number of the one or more similar contours of the respective type from the plurality of aerial images.

This aspect of the disclosed subject matter can comprise one or more of features (i) to (xiv) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of inspecting a mask usable for fabricating a semiconductor specimen, the method comprising: obtaining a plurality of aerial images each capturing a respective portion of a mask; generating a plurality of image coresets corresponding to the plurality of aerial images, comprising, for each given aerial image: i) applying a printing threshold on the given aerial image to obtain a binary image representative of a plurality of printable features thereof; ii) extracting a contour for each feature of interest (FOI) of a group of FOIs from the plurality of printable features, and generating a descriptor characterizing the contour, giving rise to a group of contours corresponding to the group of FOIs and associated with respective descriptors; and iii) creating an image coreset for the group of contours based on the respective descriptors thereof, the image coreset comprising one or more families each comprising at least one representative contour representing one or more similar contours of a respective type from the group of contours; and merging the plurality of image coresets to obtain a mask coreset, wherein each family in the mask coreset comprises at least one representative contour representing one or more similar contours of a respective type from the plurality of aerial images, the at least one representative contour being indicated as normal or abnormal based on the number of the one or more similar contours of the respective type from the plurality of aerial images.

This aspect of the disclosed subject matter can comprise one or more of features (i) to (xiv) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which:

FIG. 2 illustrates a generalized flowchart of mask inspection in accordance with certain embodiments of the presently disclosed subject matter.

FIG. 6 schematically illustrates an exemplary layout of a single-die mask and an exemplary layout of a multi-die mask in accordance with certain embodiments of the presently disclosed subject matter.

FIG. 7 shows a schematic illustration of the process of applying a printing threshold, as well as examples of an aerial image and a corresponding binary image in accordance with certain embodiments of the presently disclosed subject matter.

FIG. 8A illustrates a few examples of extracted contours for a few structural features having different shapes in accordance with certain embodiments of the presently disclosed subject matter.

FIG. 8B illustrates examples of reference contours for given contours in accordance with certain embodiments of the presently disclosed subject matter.

FIG. 9 illustrates two examples of measured deviations in accordance with certain embodiments of the presently disclosed subject matter.

FIG. 11 shows a schematic illustration of mask coreset generation based on image coresets in accordance with certain embodiments of the presently disclosed subject matter.

DETAILED DESCRIPTION OF EMBODIMENTS

Figure 1:
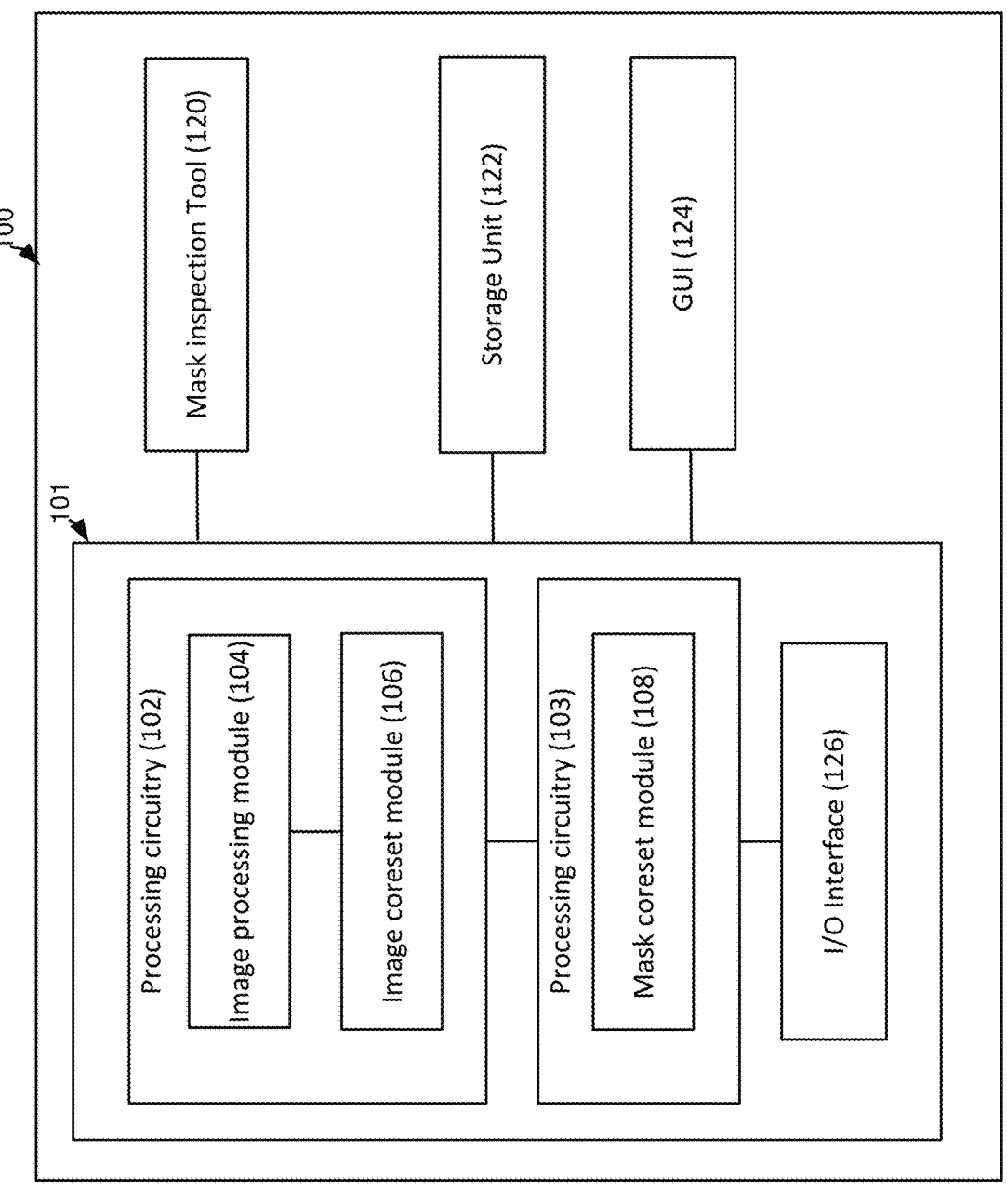
FIG. 1 illustrates a functional block diagram of a mask inspection system in accordance with certain embodiments of the presently disclosed subject matter.

Photomasks (also referred to as masks or reticles) are used to manufacture semiconductor in a photolithography process. Masks are manufactured in a complex process and can suffer from various defects and variations. One type of defect to be detected is related to edge displacement of one or more structural features on a mask.

The term "edge displacement", or "edge displacement error", used herein refers to a relatively substantial deviation of the edge/contour of a structural feature from an expected/intended position thereof.

A structural feature (also referred to herein as a structural element) can refer to any original object on the mask that has a geometrical shape/structure with a contour. In some cases, one object may be combined/superimposed with other object(s), therefore forming a complex structural feature which is a pattern. Examples of structural features can include general-shape features, such as, e.g., contacts, lines, etc., and/or features having complex structures/shapes, and/or features combined with one or more other features. A structural feature can be a 2D or 3D element, and an image capturing the structural feature can reflect a 2D representation of the structural feature.

The defect of edge displacement referred to herein may be caused by various factors, such as physical effect(s) during a fabrication process of the mask, and/or other factors such as, e.g., oxidation (which may gradually take place during usage of the mask), particles, scratches, crystals growth, electrostatic discharge (ESD), etc. Such mask defects, if not detected prior to mass production of wafers, will be repeated multiple times on the wafers, and will cause multiple semiconductor devices to be defective (e.g., affecting the functionality of the devices), thus significantly reducing the yield.

A mask comprises a mask field that will be transformed to the wafer. In some cases, a mask may contain a mask field that comprises multiple dies having the same design patterns (such a mask is referred to as a multi-die mask). In some other cases, a mask may contain a mask field that comprises a single die (such a mask is referred to as a single-die mask). In order to detect if there is a defect associated with a structural feature in a die, a reference structural feature from another die is normally required for purpose of comparison in a die-to-die inspection. However, in cases of the single-die mask, there is no reference die on the mask that can be used for comparison. Therefore, for structural features in the single die (or a scribe region in a multi-die mask as illustrated in FIG. 6), there is a need to obtain references for the purpose of defect detection.

Turning now to FIG. 6, there is schematically illustrated an exemplary layout of a single-die mask and an exemplary layout of a multi-die mask in accordance with certain embodiments of the presently disclosed subject matter.

As shown, the exemplified multi-die mask 604 comprises a mask field of nine dies (one of the dies numbered as 611) having the same design patterns. For a structural feature in any die of the mask field, one or more reference structural features can always be found in one or more of the neighboring dies. However, for the single-die mask 602 which comprises a mask field of a single die 606, there is no reference die on the mask that can be used for defect detection with respect to the structural features in the single die.

In addition, the single-die mask 602 further comprises a scribe region 608 between the die area 606 and a peripheral region 610 of the mask. The scribe region 608 contains assisting features such as, e.g., alignment features, calibration features, etc. Such assisting features/structures might be printed on the wafer in the lithography process together with the patterns in the die area. Therefore, it is also desirable to detect defects with respect to these assisting features (if any), additionally or alternatively to defect detection with respect to the structural features in the die. This also applies to the assisting features in the scribe region 612 of the multi-die mask 604 which is between the die area of the nine dies 611 and the peripheral region, as well as between the dies. However, there are no reference features for such assisting features on the mask to be used for inspection.

Certain conventional techniques related to an actinic inspection tool may acquire two images respectively from a transmitted modality and a reflected modality of the tool, and analyze the difference between the two images in order to estimate any presence of defects. However, utilizing two imaging modalities may be time-consuming in both the image acquisition process and the image processing process, thus affecting throughput (TpT) of the inspection.

Alternatively, certain inspection tools may attempt to generate a simulated image based on design data of the mask, and use the simulated image as a reference image for defect detection on the mask image. However, such methods require the acquisition of the design data of the mask, which in many cases is not available. In addition, the simulated image may be inaccurate due to uncertainty of process variations during the mask fabrication process, which may unavoidably affect the accuracy of the inspection result.

In particular, due to the continued development of advanced processes and complex features with respect to photomasks which has increased the required sensitivity of defect detection on the masks, current mask inspection methodologies are not sufficient for providing desired process control of mask features. An improved defect detection method addressing the above issues is thus required in order to accurately detect defects with respect to the structural features (e.g., the structural features in the die area of the single-die mask, as well as in the scribe region of both the single-die mask and the multi-die mask) on the mask, with higher sensitivity and less false alarms, while not affecting the inspection throughput.

Accordingly, certain embodiments of the presently disclosed subject matter propose a mask inspection system and method for detecting defects related to edge displacement errors of structural features on a mask, which does not have one or more of the disadvantages described above.

The present disclosure proposes that, for each aerial image, extracting contours for printable features of an image, and creating an image coreset for the contours. The image coreset is a smaller subset that approximates the distribution of the contours, and comprises families of representative contours of respective types. In addition, the image coresets as created for all aerial images are merged to obtain an overall mask coreset to enable sharing of contour statistics across the entire mask. The mask coreset comprises families each comprising at least one representative contour representing one or more similar contours of a respective type from all aerial images. The families and the at least one representative contour thereof are also associated with indications of normality or abnormality. The proposed method has proved to have reduced false alarm rate and improved throughput for advanced process control of the mask features, as will be detailed below.

Bearing this in mind, attention is drawn to FIG. 1 illustrating a functional block diagram of a mask inspection system in accordance with certain embodiments of the presently disclosed subject matter.

The inspection system 100 illustrated in FIG. 1 can be used for inspection of a mask during or after the mask fabrication process. As described above, the inspection referred to herein can be construed to cover any kind of operations related to defect detection, and/or defect classification of various types, and/or metrology operations, such as, e.g., critical dimension (CD) measurements, with respect to the mask or parts thereof. According to certain embodiments of the presently disclosed subject matter, the inspection system 100 comprises a computer-based system 101 capable of automatically detecting defects related to edge displacement of structural elements on the mask. System 101 is thus also referred to as a mask defect detection system, which is a sub-system of the inspection system 100.

System 100 comprises a mask inspection tool 120 operatively connected to system 101 and configured to scan a mask and capture one or more images thereof for inspection of the mask. The term "mask inspection tool" used herein should be expansively construed to cover any type of inspection tool that can be used in mask inspection related processes, including, by way of non-limiting example, scanning (in a single or in multiple scans), imaging, sampling, detecting, measuring, classifying and/or other processes provided with regard to the mask or parts thereof.

Without limiting the scope of the disclosure in any way, it should also be noted that the mask inspection tool 120 can be implemented as inspection machines of various types, such as optical inspection tools, electron beam tools, and so on. In some cases, the mask inspection tool 120 can be a relatively low-resolution inspection tool (e.g., an optical inspection tool, a low-resolution Scanning Electron Microscope (SEM), etc.). In some cases, the mask inspection tool 120 can be a relatively high-resolution inspection tool (e.g., a high-resolution SEM, an Atomic Force Microscopy (AFM), a Transmission Electron Microscope (TEM), etc.). In some cases, the inspection tool can provide both low-resolution image data and high-resolution image data. In some embodiments, the mask inspection tool 120 has metrology capabilities and can be configured to perform metrology operations on the captured images. The resulting image data (low-resolution image data and/or high-resolution image data) can be transmitted—directly or via one or more intermediate systems—to system 101.

According to certain embodiments, the mask inspection tool can be implemented as an actinic inspection tool configured to emulate/mimic optical configurations of a lithographic tool (such as, e.g., a scanner or a stepper) that is usable for fabrication of a semiconductor specimen, e.g., by projecting a pattern formed in a mask onto a wafer.

Figure 5:
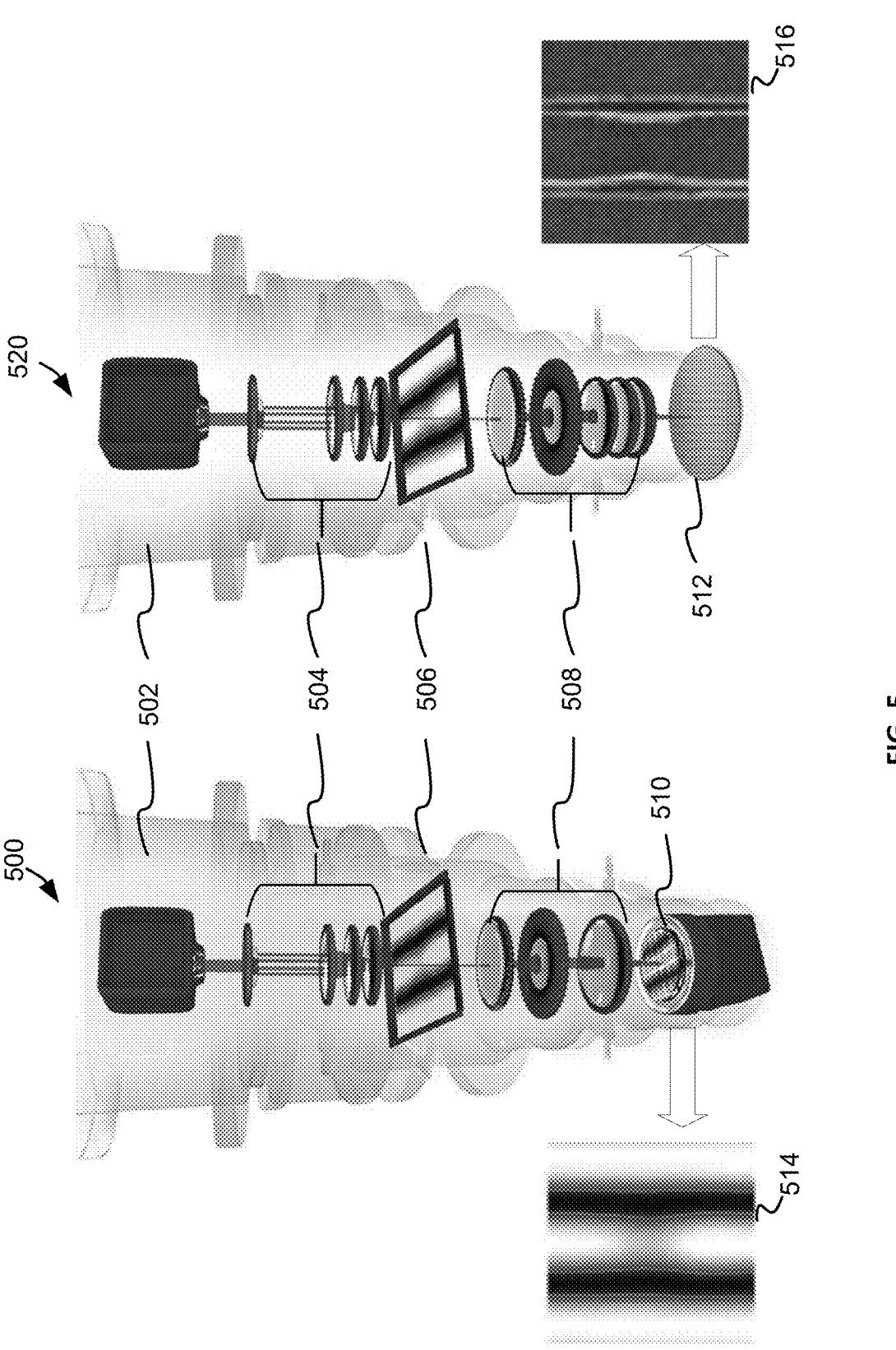
FIG. 5 illustrates a schematic illustration of an actinic inspection tool and a lithographic tool in accordance with certain embodiments of the presently disclosed subject matter.

Turning now to FIG. 5, there is shown a schematic illustration of an actinic inspection tool and a lithographic tool in accordance with certain embodiments of the presently disclosed subject matter.

Similar to a lithographic tool 520, an actinic inspection tool 500 may include an illumination source 502 configured to generate light (e.g., laser) at an exposure wavelength, illumination optics 504, mask holder 506, and projection optics 508. The illumination optics 504 and projection optics 508 may include one or more optical elements (such as, e.g., a lens, aperture, a spatial filter, etc.).

In a lithographic tool 520, a mask is positioned at the mask holder 506 and optically aligned to project an image of the circuit pattern to be duplicated onto a wafer placed on the wafer holder 512 (e.g., by employing various stepping, scanning and/or imaging techniques to produce or replicate the pattern on the wafer). Unlike the lithographic tool 520, instead of placing a wafer holder 512, the actinic inspection tool 500 places a detector 510 (such as, e.g., charge-coupled device (CCD)) at the location of the wafer holder. The detector 510 is configured to detect the light that is projected through the mask, and generate an image of the mask.

As can be seen, the actinic inspection tool 500 is configured to emulate optical configurations of the lithographic tool 520, including but not limited to, e.g., illumination/exposure conditions such as wavelength, pupil shape, numerical aperture (NA), etc. Therefore, the mask image 514 acquired by the detector 510 is expected to resemble an image 516 of a wafer that is fabricated using the mask via the lithographic tool 520. A mask image acquired using such an actinic inspection tool is also referred to as an aerial image in the present disclosure. The aerial image is provided to system 101 for further processing, as described below.

According to certain embodiments, in some cases, the mask inspection tool 120 can be implemented as a non-actinic inspection tool, such as, e.g., a regular optical inspection tool, an electron beam tool, etc. In such cases, the non-actinic inspection tool can be configured to acquire an image of the mask. Simulation can be performed on the acquired image to simulate the optical configuration of the lithographic tool, thereby generating an aerial image. In some cases, the simulation can be performed by the system 101 (e.g., the functionality of the simulation can be integrated into the processing circuitry 102 thereof), while in some other cases, the simulation can be performed by a processing module of the mask inspection tool 120, or by a separate simulation unit which is operatively connected to the mask inspection tool 120 and system 101.

System 101 includes a processing circuitry 102 and a processing circuitry 103 operatively connected to a hardware-based I/O interface 126 and configured to provide processing necessary for operating the system, as further detailed with reference to FIGS. 2-4. Either processing circuitry of the processing circuitry 102 and processing circuitry 103 can comprise one or more processors (not shown separately) and one or more memories (not shown separately). The one or more processors of the processing circuitry can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

According to certain embodiments, the functional modules comprised in processing circuitry 102 of system 101 can include an image processing module 104 and an image coreset module 106 operatively connected to each other. The processing circuitry 102 can be configured to obtain, via I/O interface 126, a plurality of aerial images each capturing a respective portion of a mask. By way of example, the aerial images can be acquired by the mask inspection tool 120, such as, e.g., an actinic inspection tool.

The image coreset module 106 can be configured to generate a plurality of coresets corresponding to the plurality of aerial images. Specifically, for each given aerial image, the image coreset module 106 can be configured to apply a printing threshold on the given aerial image to obtain a binary image representative of a plurality of printable features thereof, extract a contour for each feature of interest (FOI) of a group of FOIs from the plurality of printable features, and generate a descriptor characterizing the contour, giving rise to a group of contours corresponding to the group of FOIs and associated with respective descriptors. The image coreset module 106 can be further configured to create an image coreset for the group of contours based on the respective descriptors thereof. The image coreset comprises one or more families, each comprising at least one representative contour representing one or more similar contours of a respective type from the group of contours.

The functional module(s) comprised in processing circuitry 103 can include a mask coreset module 108. The mask coreset module 108 can be configured to merge the plurality of coresets to an overall mask coreset. The mask coreset comprises one or more families. Each family in the mask coreset comprises at least one representative contour representing one or more similar contours of a respective type from the plurality of aerial images. The at least one representative contour of each family is indicated as normal or abnormal based on the number of the one or more similar contours of the respective type from the plurality of aerial images.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as various image processing operations, and coreset creation, etc., can thus be performed by respective processors (or processor combinations) in the processing circuitry 102, while, optionally, these operations may be performed by the same processor. The present disclosure should not be limited to being construed as one single processor always performing all the operations. The above applies similarly to processing circuitry 103.

It is also to be noted that although the processing circuitry 102 and processing circuitry 103 are illustrated in FIG. 1 as two separate processing circuitries operatively connected to each other, this is for exemplary purposes only and should not be regarded as limiting the present disclosure. In some cases, the functionalities of these two processing circuitries can be (at least partially) combined and integrated into one processing circuitry, or integrated/divided differently into a number of processing circuitries. In some cases, the functionalities of the two processing circuitries can be integrated as part of the inspection tool 120, while in some other cases, at least some of the functionalities, such as the functionalities of the mask coreset module 108, can be implemented in a separate device, such as a server operatively connected to the inspection tool (either locally or remotely).

According to certain embodiments, system 100 can comprise a storage unit 122. The storage unit 122 can be configured to store any data necessary for operating systems 100 and 101, e.g., data related to input and output of systems 100 and 101, as well as intermediate processing results generated by system 101. By way of example, the storage unit 122 can be configured to store the image(s) produced by the mask inspection tool 120 and/or derivatives thereof (e.g., images after pre-processing). Accordingly, the image(s) can be retrieved from the storage unit 122 and provided to the PMC 102 for further processing. The output of the system 101, such as, e.g., the plurality of image coresets, the mask coreset, etc., can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the mask (for example, by a display forming part of GUI 124), including images of the mask and/or image representation of the structural features. The user may be provided, through the GUI, with options of defining certain operation parameters, such as, e.g., a printing threshold, a deviation threshold, the detection threshold, etc. In some cases, the user may also view operation results, such as the coreset families, measured deviations, detected defects, and/or further examination results on the GUI.

In some embodiments, additionally to system 101, the mask inspection system 100 can further comprise one or more inspection modules, such as, e.g., additional defect detection module(s) and/or Automatic Defect Review Module (ADR) and/or Automatic Defect Classification Module (ADC) and/or metrology-related module and/or other inspection modules which are usable for performing additional inspection of a mask. The one or more inspection modules can be implemented as stand-alone computers, or their functionalities (or at least some thereof) can be integrated with the mask inspection tool 120. In some embodiments, the output as obtained from system 101 can be used by the mask inspection tool 120 and/or the one or more inspection modules (or part thereof) for further inspection of the mask.

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It is noted that the examination system illustrated in FIG. 1 can be implemented in a distributed computing environment, in which the aforementioned functional modules as comprised in the processing circuitries 102 and 103 can be distributed over several local and/or remote devices, and can be linked through a communication network. By way of example, the inspection tool 120 and the system 101 can be located at the same entity (in some cases hosted by the same device) or distributed over different entities. By way of another example, the processing circuitries 102 and 103 can be located at the same entity (in some cases hosted by the same device) or distributed over different entities. For instance, in some cases, the processing circuitries 102 can be hosted by the inspection tool 120, while the processing circuitries 103 can be implemented at a separate server (either locally or remotely) operatively connected to the tool.

In some examples, certain components utilize a cloud implementation, e.g., are implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It is further noted that in other embodiments at least some of the inspection tool 120, storage unit 122 and/or GUI 124 can be external to the examination system 100 and operate in data communication with system 101 via I/O interface 126. System 101 can be implemented as stand-alone computer(s) to be used in conjunction with the inspection tool. Alternatively, the respective functions of the system 101 can, at least partly, be integrated with the mask inspection tool 120, thereby facilitating and enhancing the functionalities of the mask inspection tool 120 in inspection-related processes.

Figure 3:
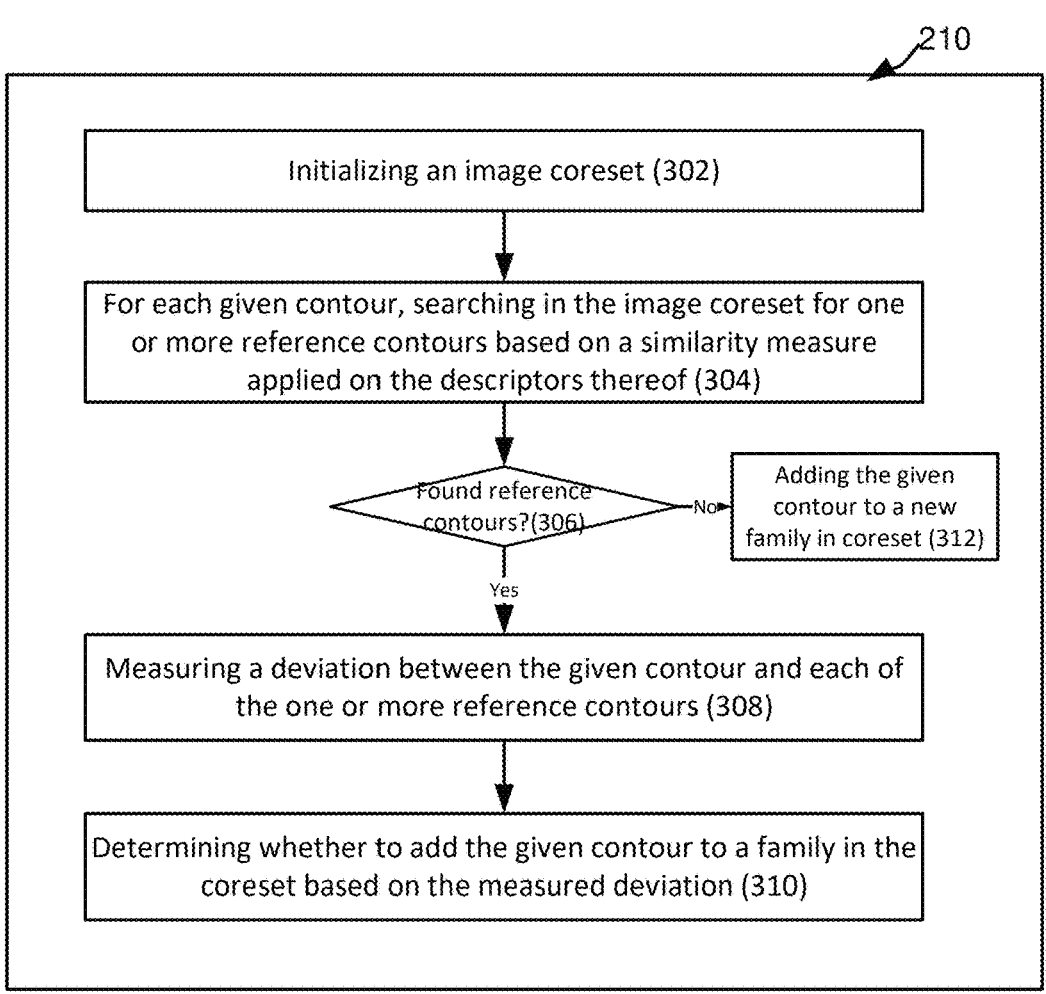
FIG. 3 illustrates a generalized flowchart of creating a coreset for the group of contours in accordance with certain embodiments of the presently disclosed subject matter.
Figure 4:
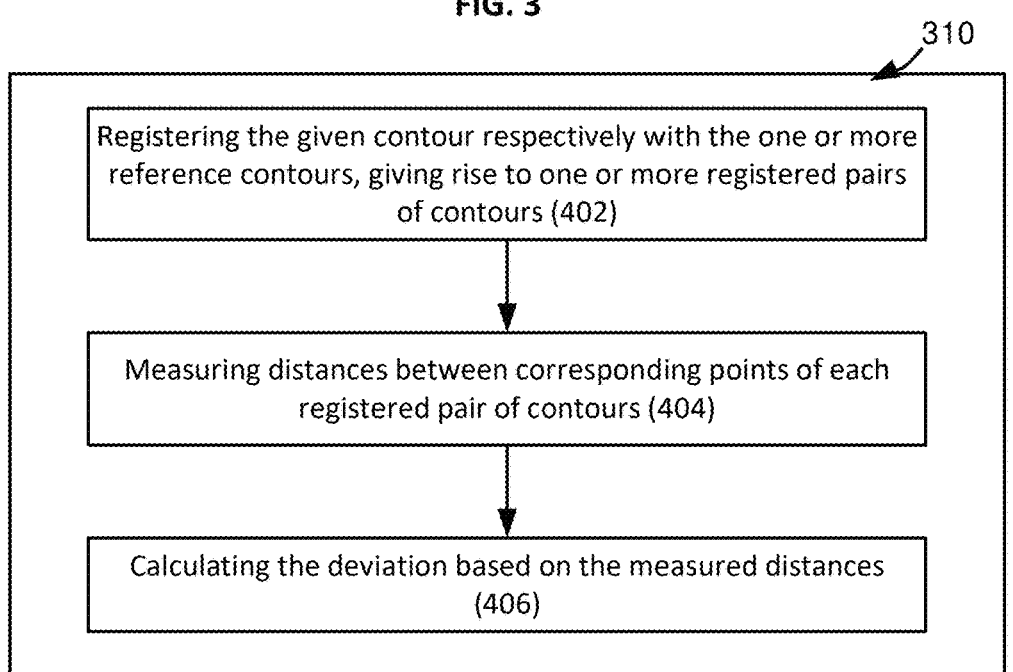
FIG. 4 illustrates a generalized flowchart of measuring a deviation between a given contour and the reference contours thereof in accordance with certain embodiments of the presently disclosed subject matter.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring now to FIG. 2, there is illustrated a generalized flowchart of mask inspection in accordance with certain embodiments of the presently disclosed subject matter.

A plurality of aerial images can be obtained (202) (e.g., by the processing circuitry 102 via I/O interface 126, from the mask inspection tool 120 or from the storage unit 122), each capturing a respective portion of a mask. By way of example, the plurality of aerial images can be acquired by emulating optical configuration of a lithographic tool usable for fabrication of the semiconductor specimen.

In some embodiments, the mask to be inspected is a single-die mask. As exemplified in 602 of FIG. 6, the mask field of the single-die mask, including the die area of the single die 606 and the scribe region 608 (containing assisting features such as, e.g., alignment features, calibration features, etc.), comprise printable features/structures that will be transferred onto the wafer during the lithography process. Therefore, the presently proposed inspection method is applicable to detect defects with respect to any of these regions/areas. By way of example, the aerial images as obtained can be representative of at least part of the single die area and/or at least part of the scribe region.

In some other embodiments, the mask to be inspected can be a multi-die mask, as exemplified in 604 of FIG. 6. In such cases, the presently proposed inspection method is applicable to detect defects with respect to at least part of the scribe region 612 (as well as the die area 611 when needed) in the multi-die mask.

In some embodiments, the aerial images are acquired by an actinic mask inspection tool, such as, e.g., the Aera Mask Inspection tool of Applied Materials Inc. As described above with reference to FIG. 5, the actinic mask inspection tool is specifically configured to emulate the optical configurations of a lithographic tool (e.g., a scanner or a stepper) used for fabrication of the semiconductor wafers in accordance with the mask. The optical configurations to be emulated can include one or more of the following illumination/exposure conditions such as, e.g., wavelength, pupil shape, numerical aperture (NA), etc.

The aerial images acquired by such an actinic inspection tool are expected to resemble an image of a wafer that is fabricated using the mask via the lithographic tool. In other words, the actinic mask inspection tool is configured so as to capture a mask image which can mimic how the design patterns in the mask would actually appear in a physical wafer after the fabrication process.

In some cases, an actinic inspection tool may not be available for inspecting the mask. In such cases, a non-actinic inspection tool, such as, e.g., a regular optical inspection tool, an electron beam tool, etc., can be used to acquire images (non-aerial images) of the mask. Simulation can be performed on the acquired non-aerial images to simulate the optical configurations of the lithographic tool, thereby generating aerial images of the mask. Accordingly, in some embodiments, the mask inspection method as described with reference to FIG. 2 can further comprise the preliminary steps of obtaining images acquired by a non-actinic inspection tool, and performing simulation (e.g., by the image processing module 104, or by a processing module of the mask inspection tool 120, etc.) on the images to simulate the optical configuration of the lithographic tool, giving rise to the aerial images.

In some embodiments, the aerial images as obtained may be pre-processed prior to the further processing, as will be described with reference to FIG. 2. The pre-processing may include one or more of the following operations: interpolation (e.g., in case of the first image having a relatively low resolution), noise filtration, focus corrections, aberration compensation, image format transformation, etc.

It is to be noted the present disclosure is not limited to the specific modality of the mask inspection tool, the type of images acquired thereby, and/or the pre-processing operations required for processing the images.

A plurality of image coresets corresponding to the plurality of aerial images can be generated (204) (e.g., by the image coreset module 106). The image coresets generated for the aerial images are also referred to as image-level coresets, or simply coresets, as compared to the overall mask coreset generated for the entire mask (also referred to as mask-level coreset) as will be described below in further detail with reference to block 212. Specifically, for each given aerial image of the plurality of aerial images, a respective image coreset can be created as follows. A printing threshold can be applied (206) on the given aerial image to obtain a binary image representative of a plurality of printable features thereof. The printable features refer to structural features on the mask which are printable on a semiconductor specimen such as a wafer.

Referring now to FIG. 7, there is shown a schematic illustration of the process of applying a printing threshold, as well as examples of an aerial image and a corresponding binary image in accordance with certain embodiments of the presently disclosed subject matter.

As shown, the illustration 700 demonstrates a cross-section view of a part of an exemplified mask that comprises a transparent area 702 (e.g., made of quartz) which, upon illumination, transmits the light, and an opaque area 704 (e.g., made of chrome) which blocks the light. An aerial image obtained as described above refers to an image that is captured by a detector collecting the transmitted light through the mask, as exemplified by image 710.

In fact, the actual wafer fabrication process by the fabrication tool (e.g., the scanner or stepper) includes a resist process and an etch process following the lithography process. The wafer is coated with photoresist which is a photosensitive material. Exposure to the light causes sections of the resist to either harden or soften, depending on the process. After exposure, the wafer is developed, causing the photoresist to dissolve in certain areas according to the amount of transmitted light (i.e., the light intensity) the areas received during exposure.

By way of example, a waveform 705 representative of the intensity of the transmitted light is illustrated. The patterns will be printed on the wafer if the photoresist at a given area is exposed below a specific intensity of the transmitted light. These areas of photoresist and no photoresist reproduce the design patterns on the mask. The specific intensity is therefore known as a printing threshold 706, as exemplified in FIG. 7. The developed wafer is then exposed to solvents which etch away the silicon in the parts of the wafer that are no longer protected by the photoresist coating, giving rise to a printed wafer 708 (for a given layer).

Accordingly, in the actinic inspection tool that mimics the optical configuration of the wafer fabrication tool, the waveform 705 represents the transmitted light that will be captured by the detector of the actinic inspection tool to form the aerial image. Since in the actinic inspection tool, the detector replaced the wafer and there is no actual resist and etching process, in order to obtain an image that resembles the printed wafer, a printing threshold 706 needs to be applied to the aerial image to mimic the effect of the resist and etching process, giving rise to a binary image which comprises the printable features on the wafer. Specifically, the binary image is representative of a plurality of structural features of the mask which are printable (i.e., printable features) on the wafer.

FIG. 7 also illustrates an example of an aerial image 710 and a corresponding binary image 720 generated after applying a printing threshold to the first image. As shown, the binary image 720 resembles the printed patterns on the wafer 708. It is to be noted that although, in the present example, the patterns below the printing threshold are illustrated as printable on the wafer (i.e., positive resist), this is not necessarily so. In some other cases, it could be the opposite, i.e., the patterns above the printing threshold are printable on the wafer (i.e., negative resist). The present disclosure is not limited to the specific resist process, nor the specific application of the printing threshold, for rendering the printable features.

Continuing with the description of FIG. 2, for each given aerial image, a contour for each feature of interest (FOI) of a group of FOIs from the plurality of printable features can be extracted (208) (e.g., by the image processing module 104 of processing circuitry 102).

In some embodiments, a group of features of interest (FOIs) can be selected from the plurality of printable features, and the contour extraction can be performed for each FOI in the group. By way of example, the group of FOIs can be selected based on one or more of the following factors: the location of the printable features on the binary image, the type and/or shape of the printable features, the printable features as detected in a previous inspection as defect candidates, and customer input/feedback regarding the importance of certain printable features to be inspected, etc. In some cases, the selection can be skipped, and the group of FOIs can actually comprise the entire population of the plurality of printable features on the binary image.

Figures 8A, 8B:
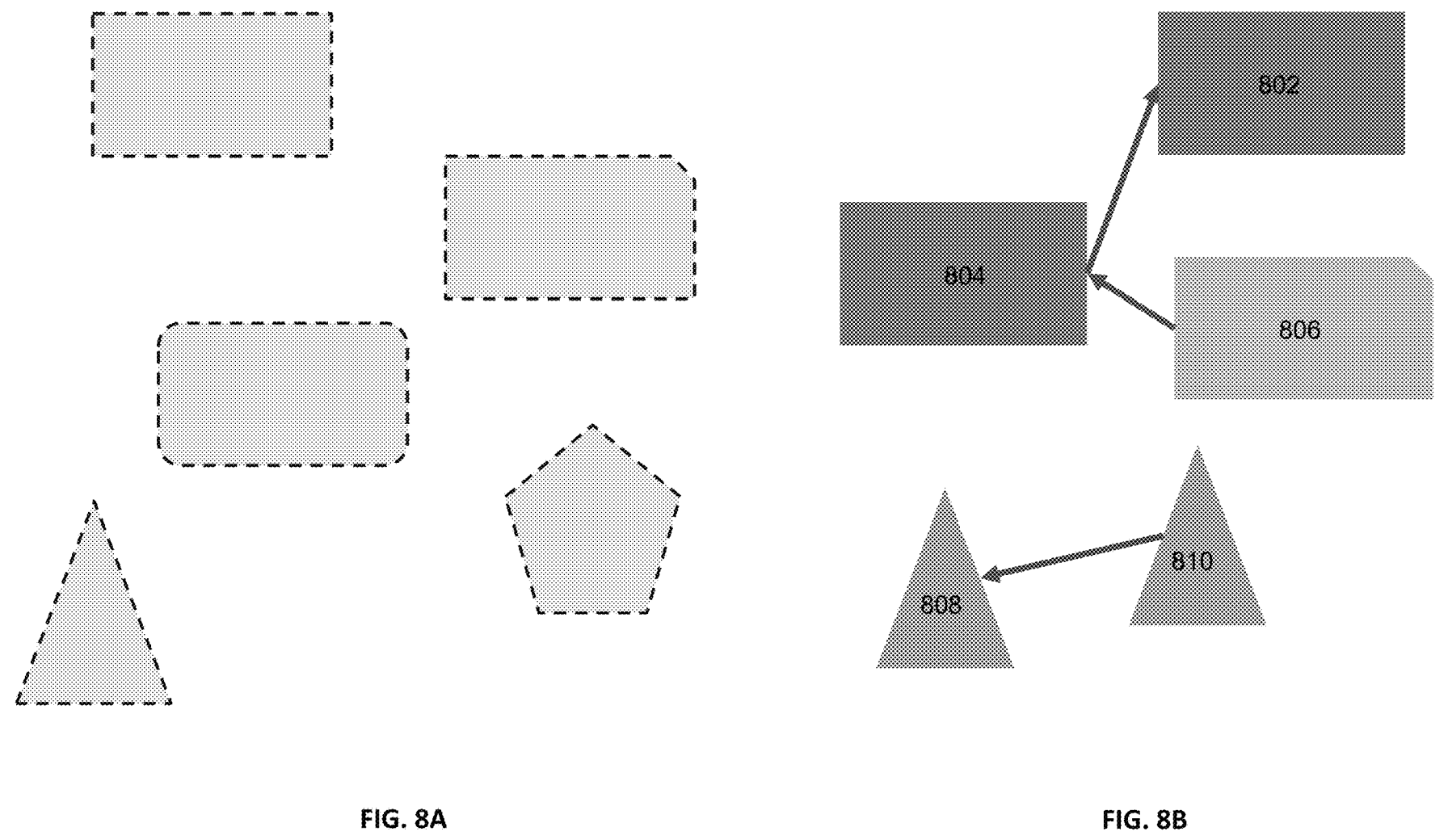

The term "contour" can refer to an outline or boundary of a structural feature. In some embodiments of the present disclosure, the contour of a feature can be estimated by using a contour detection method. By way of example, the contour detection method can be implemented using any kind of contour detection/extraction algorithm, such as, e.g., Canny, Sobel, or Moore Neighbor Contour tracing algorithm, etc. Another example of an edge detection algorithm applicable to the present subject matter is described in U.S. Pat. No. 9,165,376 titled "System, method and computer readable medium for detecting edges of a pattern", which is assigned to the assignee of the present patent application and incorporated herein in its entirety by reference. FIG. 8A illustrates a few examples of extracted contours (marked by dashed lines) for a few structural features having different shapes in accordance with certain embodiments of the presently disclosed subject matter.

A descriptor characterizing the extracted contour can be generated. The descriptor can be obtained/created in various manners. By way of example, the descriptor of a contour can be generated based on one or more of the following properties of the contour: the area formed by the contour, width of the area, height of the area, the number of pixels along the contour (e.g., by counting the number of pixels belonging to the contour), a chain code, a center of gravity, and polar coordinates of the contour, etc. For instance, a chain code can be used to represent a contour by a connected sequence of straight-line segments of specified length and direction. Typically, this representation is based on 4 or 8 connectivity of the segments. The direction of each segment is coded by using a numbering scheme. A contour code formed as a sequence of such directional numbers is referred to as a chain code which is indicative of the shape of the contour. In another example, a contour can be converted into its polar coordinates which can be represented as, e.g., a Theta-Radius histogram. In some cases, using polar coordinates, such as the polar-coordinate based histogram, as the descriptor (or part thereof) of a contour may enable to improve throughput (TpT) and efficiency of the comparison and measurement between contours.

In such ways, a group of contours corresponding to the group of FOIs from the plurality of printable features can be obtained, associated with their respective descriptors. The group of contours and their descriptors can be represented in different data formats, such as, e.g., a table, vectors, lists, etc. By way of example, a table representation can comprise N rows, each representing a specific contour of the group of N contours, and one or more columns representing the descriptors associated with the contours.

An image coreset can be created (210) (e.g., by the image coreset module 106 of processing circuitry 102) for the group of contours based on the respective descriptors thereof. The image coreset comprises one or more families, each comprising at least one representative contour representing one or more similar contours of a respective type from the group of contours.

A coreset of an original set usually refers to a smaller set of samples that approximates the larger original set in terms of, e.g., the shape/distribution thereof. Such approximation can ensure that solving a problem on the coreset as its input, may provably yield the same or similar result as solving the same problem on the original set. As the coreset selection takes into account the distribution of the entire population of the original set, the representative subset can preserve the sparsity of the original set. For instance, the coreset can well represent both dense areas as well as sparse areas of the distribution of the original set, with a much smaller number of selected samples as compared to some other types of sampling, such as, e.g., random sampling.

In some embodiments of the present disclosure, a coreset of the group of contours refers to a representative subset of contours that approximates the distribution of the group of contours (such as, e.g., the distribution of the contours in the attribute space). As the coreset is created for representing the group of contours extracted for a given aerial image (or a binary image thereof), such a coreset is also referred to herein as a coreset at image level, or an image coreset. The image coreset comprises one or more families, each comprising at least one representative contour representing one or more similar contours of a respective type from the group of contours.

There are various ways to select/construct the coreset for the group of contours, such as, e.g., the greedy-based method, or statistics-based method, etc. FIG. 3 illustrates a generalized flowchart of creating a coreset for the group of contours in accordance with certain embodiments of the presently disclosed subject matter.

An image coreset can be firstly initialized (302) (e.g., by the image coreset module 106 of processing circuitry 102), as a preliminary step of the construction process. The initial image coreset can be constructed as an empty set, prior to processing of any contour in the group. Sequentially, for each given contour in the group of contours, a search in the image coreset for one or more reference contours can be performed (304) based on a similarity measure applied on the descriptors thereof (e.g., descriptors of the given contour and any remaining contours in the coreset (also referred to as candidate contours)).

In some embodiments, the one or more reference contours can be identified by comparing the descriptor associated with the given contour with respective descriptors associated with at least some of the remaining contours in the coreset. The comparison can be based on a similarity measure, and the one or more contours that meet a similarity criterion can be identified as the reference contours of the given contour.

By way of example, the similarity measure can be a distance-based metric, such as, e.g., Euclidean distance, Manhattan distance, Cosine distance, Pearson Correlation distance, Spearman correlation distance, etc. The similarity criterion can be a predetermined distance. In some cases, the number of reference contours to be identified can also be predetermined.

In one example, the comparison can be performed by, e.g., starting from the first candidate contour in the coreset, calculating a distance between each pair of descriptors of the given contour and a candidate contour from the remaining contours in the coreset, and upon the number of similar contours whose distances meet the similarity criterion being satisfied, the searching process ends, and the similar contours as identified will be provided.

Alternatively, in another example, the comparison can be performed by calculating a distance for each candidate contour in the remaining contours with respect to the given contour, and selecting the predetermined number of reference contours by ranking the calculated distances. In some cases, the number of reference contours to be identified are not predetermined. All the candidate contours whose distances meet the similarity criterion can be identified as reference contours.

Referring to FIG. 8B, there are illustrated examples of reference contours for given contours in accordance with certain embodiments of the presently disclosed subject matter.

Assume the number of reference contours to be identified for each given contour is one. By way of example, for contour 804, the candidate contour that is identified to meet the similarity criterion can be contour 802. For contour 806, the candidate contour that is identified to meet the similarity criterion is contour 804 or 802. If the number of reference contours is predetermined to be two, then both contours 802 and 804 can be determined as reference contours for contour 806. For contour 810, the reference contour thereof is contour 808.

A determination with respect to whether reference contours are identified can be made (306). In cases where one or more reference contours are identified, a deviation can be measured (308) between the given contour and each of the one or more reference contours, and it can be determined (310) whether to add the given contour to a family in the image coreset based on the measured deviation. Otherwise, if no reference contours are identified, the given contour can be directly added (312) to a new family in the image coreset.

FIG. 4 illustrates a generalized flowchart of measuring a deviation between a given contour and the reference contours thereof in accordance with certain embodiments of the presently disclosed subject matter.

As described above, the defect to be detected herein refers to an edge displacement (or edge displacement error) indicative of a relatively substantial deviation of the given contour from an expected position thereof (e.g., the position of the contour as it is expected to be according to its original design data, or according to the identified reference contours). It is to be noted that the edge displacement differs from edge roughness (which may be caused by different variations in the fabrication process) at least in that: i) the edge displacement is local (which is present at a local position of the contour), whereas the edge roughness is present all along the edges, and ii) the amplitude of the deviation of the edge displacement is relatively more substantial (i.e., stronger/larger) as compared to the amplitude of the subtle roughness along the edges.

Such edge displacement may be caused, in some cases, by certain physical effects during the fabrication process of the mask and/or other factors, such as, e.g., oxidation, particles, scratches, crystals growth, electrostatic discharge (ESD) etc., which, upon being printed on the wafer, may affect electrical measurements of the fabricated devices, thus possibly causing yield decrease and device performance degradation/failure. Therefore, it is necessary to detect such displacement defects and measure the amplitude thereof.

Specifically, for measuring the deviation indicative of the amplitude of any possible displacement, the given contour can be respectively registered (402) with the one or more reference contours, giving rise to one or more registered pairs of contours. By way of example, the registration can be performed by aligning the center of gravity and/or certain anchor points of the given contour and a reference contour. Distances between corresponding points of each registered pair of contours can be measured (404). By way of example, the distances can be measured using a distance metric, such as a Hausdorff distance metric. The deviation can be calculated (406) based on the measured distances in various ways. By way of example, a maximal distance can be selected from the measured distances and used as the measured deviation between the given contour and a respective reference contour (of the one or more similar contours). By way of another example, an averaged distance of the measured distances can be derived and used as the measured deviation between the given contour and a respective reference contour.

The measured deviation between the given contour and each of the one or more reference contours can be used to determine whether to add the given contour into the coreset as described with reference to block 310. In some embodiments, once one or more measured deviations between the given contour and the one or more reference contours are calculated, a combined deviation can be derived based on the one or more measured deviations, and a deviation threshold can be applied to the combined deviation.

In some cases, the deviation threshold can be predetermined in accordance with, e.g., the specific inspection application, the type of structural features, technology node and/or specs used by the customer, etc. The combined deviation can be derived, for instance, by averaging (or weighted averaging) the one or more measured deviations, such as, e.g., mean or median or any other kinds of averaging calculations (with or without weights) of the deviations. By way of example, in cases where three reference contours of a given contour are identified, three deviations are respectively measured between the given contour and the three reference contours. The three deviations can be averaged to generate a combined deviation which will be compared to a deviation threshold.

In cases where the combined deviation crosses the deviation threshold (e.g., the combined deviation exceeds the threshold), the given contour can be regarded as a different type of contour that has no representative in the coreset, and thus will be added into the coreset as a representative contour of a separate/new family. Otherwise, in cases where the combined deviation is below the deviation threshold, the given contour and the reference contours in the coreset are regarded as similar contours belonging to the same type of contours. Since the given contour already has representatives in the coreset (i.e., the reference contours thereof), it will not be added into the coreset. In such cases, for the same type of contours, only one representative contour (or in some cases more than one, e.g., when the process variations between contours of the same type are slightly prominent, but still smaller than the deviation threshold) is kept in the coreset instead of numerous repetitive instances.

Referring now to FIG. 9, there are illustrated two examples of measured deviations in accordance with certain embodiments of the presently disclosed subject matter.

Graph 900 illustrates a contour 904 of a structural feature having an oval shape, and a reference contour 902 as identified in the coreset for the contour 904 and representative of an expected position of the contour of a defect-free structural feature. As shown, the two contours are registered. In the present example, a maximal distance 906 is measured as the deviation between the given contour 904 and the reference contour 902. In cases where the deviation is larger than a predetermined deviation threshold, the contour 904 can be regarded as a different type of contour that has no representative in the coreset, and thus will be added into the coreset as a representative contour of a separate/new family. Graph 910 illustrates an example where the deviation at the location of 912 and at the location of 914 are smaller than a predetermined deviation threshold, in which case the contour is regarded as a similar contour to the reference contour, and will not be added into the coreset.

In some embodiments, when traversing the contours from the group of contours extracted for a given image as described in the coreset construction process with reference to FIGS. 3 and 4, each family in the image coreset can be associated with a count of the number of similar contours of the respective type of contours that are represented by the at least one representative contour of the family. The count/number of such contours represented by each family can be continuously updated during the processing of the given contours. By way of example, when processing a given contour from the group of contours, if a reference contour for the given contour is found from a family in the coreset, and the measured deviation does not exceed a deviation threshold, the given contour does not need to be added to the family as it is already represented by the reference contour. The count associated with the family will increase by one, indicating an update of the number of similar contours represented by this family. In cases where no reference contour is found, or in cases where a reference contour is found, but the measured deviation exceeds the deviation threshold, the given contour will form a new family, and the count associated with the new family will be initialized to one.

Figure 10:
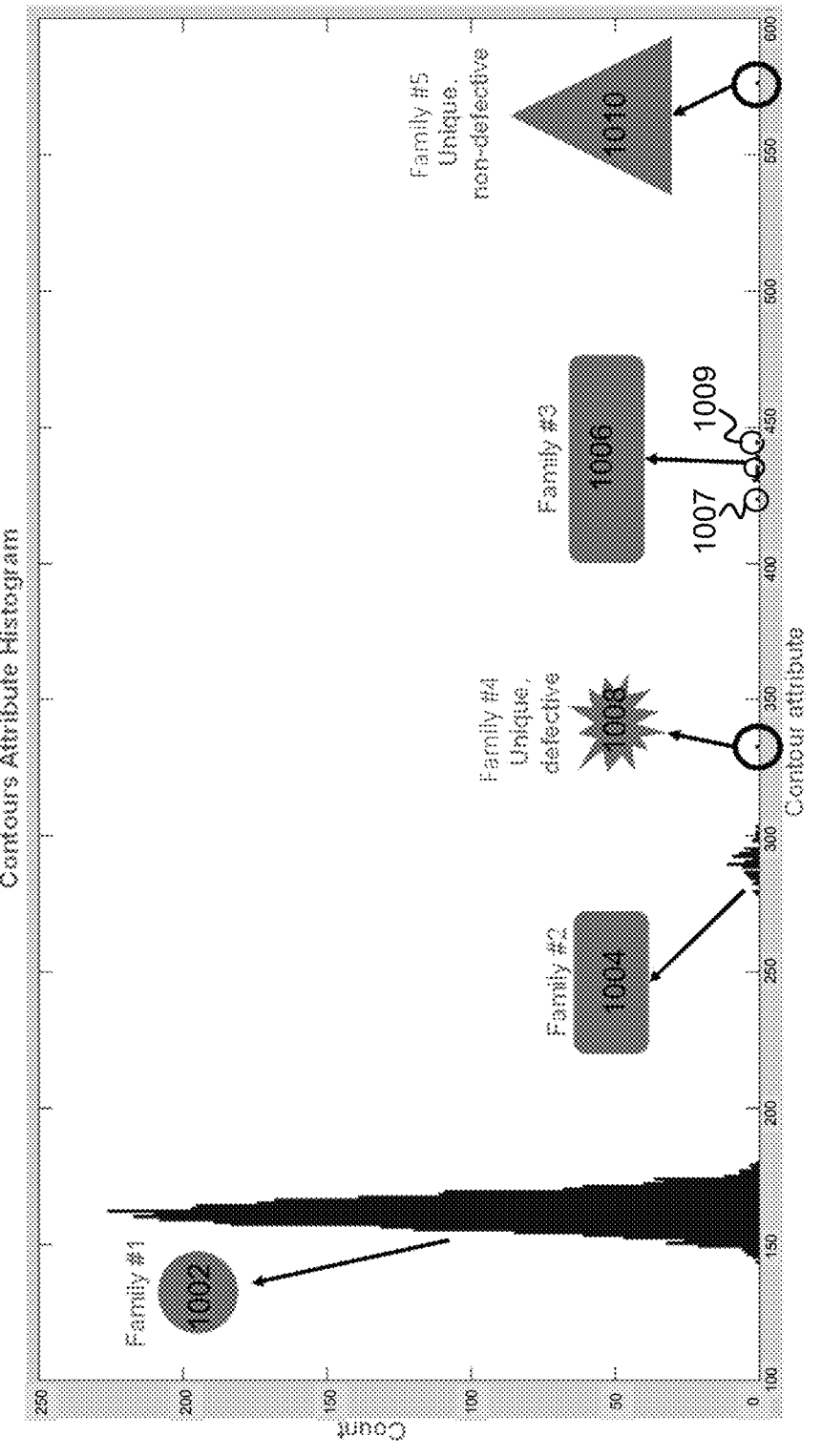
FIG. 10 illustrates an example of a histogram representation of an image coreset created for a given image in accordance with certain embodiments of the presently disclosed subject matter.

FIG. 10 illustrates an example of a histogram representation of a group of contours extracted from a given image in accordance with certain embodiments of the presently disclosed subject matter.

Assume an aerial image representative of a portion of mask is acquired, and the processing as described with respect to blocks 206 and 208 is performed, giving rise to a group of contours corresponding to a group of FOIs from the printable features of the image. For purpose of creating an image coreset for the group of contours, the process as described with respect to FIG. 3 can be performed. Specifically, an initial image coreset can be firstly constructed, e.g., as an empty subset. A first contour in the group of contours, such as the contour 1002, is to be processed. Since the present coreset is empty, when performing searches for reference contours, no reference contours are identified for the first contour. Thus, the first contour is directly added into the coreset, forming family #1 comprising the representative contour 1002 of the first type of contours (e.g., a circular contour characterized by specific attributes).

A second contour in the group, such as the contour 1004, is to be processed next. During the search for reference contours, depending on the similarity measure/similarity criterion, no reference contour is found, since, e.g., the distance between the first contour and the second contour does not meet a predefined similarity criterion. The second contour is thus also directly added into the coreset, forming family #2 comprising the representative contour 1004 of the second type of contours (e.g., a square contour characterized by specific contour attributes).

Assume a third contour in the group is the contour 1006. When searching for reference contours, contour 1004 is found to be similar to contour 1006. However, when measuring the deviation between the two contours, the measured deviation exceeds a deviation threshold. Therefore, contour 1006 is regarded as a different type of contour and is assigned to a new family #3, which comprises the representative contour 1006 of the third type of contours (e.g., a square contour with contour attributes different from the previous square contour). Until now the coreset comprises three families #1-#3, each comprising one representative contour.

Similarly, for any subsequent contours in the group, the above process will be repeated to determine whether to add it to the coreset, or whether it is already represented by any family. For instance, for any contour that is similar to contour 1002 in family #1, where the deviation therebetween is below the deviation threshold, such a contour will be regarded as similar contours of the same type as of contour 1002 and will not be added again to the coreset. The count of the number of contours represented by family #1 will increase by one. Occasionally, in cases where a subsequent contour presents prominent variations from contour 1002 which are still below the deviation threshold, such a contour can be added to family #1 as an additional representative contour of the same type of contours.

By way of example, for family #3, assume the representative contour 1006 is located in the center of the distribution in this family. If a subsequent contour 1007 arrives, whose deviation from 1006 is slightly prominent (illustrated by the distance between 1006 and 1007 in the X axis), although still below the deviation threshold, the contour 1007 can be added as another representative of this type of contour into family #3. Similarly, contour 1009 can be added to family #3 as an additional representative for similar reasons.

In some cases, once all the contours in the group of contours are processed, each family formed in the image coreset can be associated with an indication whether the at least one representative contour thereof is indicated as normal or unique/abnormal at an image level. The indication can be derived based on the number of similar contours of the respective type from the group of contours that are represented by the family.

In the present example, one or more unique families may be identified, such as family #4 and family #5. These two families are considered unique as each of them comprises a special type of contours whose count of the number of contours represented by the family is very rare, indicative of sparse appearance of such features on the given portion of mask. By way of example, upon processing all contours in the given image, the number of the special contours 1008 in family #4 appears to be one, and so is the number of special contours 1010 in family #5. This is in comparison with the relatively large number of contours in family #1 which sums up to a few thousands, while the number of contours in family #2 sums up to a few hundreds, and a few tens in family #3. In such cases, families #1-#3, or the representative contours therein, are considered as normal based on the frequent/large number of repetitive occurrences of the type of contours thereof in the given portion of the mask, whereas families #4-#5, or the representative contours therein, are considered as unique/abnormal based on the rare/sparse occurrence of the type of contours thereof.

It is to be noted that the coreset as created, as well as the normality and abnormality of the families and/or contours thereof, are insofar determined only within respect to the given aerial image. Therefore, such a coreset is referred to as an image-level coreset, or an image coreset, as described above. The families and/or the representative contours thereof are indicated as normal or abnormal at an image level.

It is also to be noted that the exemplified method of creating a coreset described with reference to FIG. 3 is merely one possible way for coreset selection/construction. Other methods of coreset creation, such as the ones based on statistics and distributions, such as, e.g., K means algorithm, kernel density estimation (KDE) algorithm, etc., can be used in lieu of the above.

Once the image coreset is created for each aerial image as described above, a plurality of image coresets corresponding to the plurality of aerial images are obtained. The plurality of image coresets can be merged (212) (e.g., by the mask coreset module 1086 of the processing circuitry 103) to obtain an overall coreset of the mask. Each family in the mask coreset comprises at least one representative contour representing one or more similar contours of a respective type from the plurality of aerial images. The at least one representative contour in a given family can be indicated as normal or abnormal based on the number of the similar contours of the respective type from the plurality of aerial images. By way of example, the mask coreset can comprise at least one of: a family comprising at least one normal contour, or a family comprising at least one abnormal contour.

In some embodiments, the merging of the plurality of image coresets into an overall mask coreset can be performed in a similar manner as the process described with reference to FIGS. 3 and 4. In general, deviation between representative contours from different image coresets of the plurality of image coresets can be measured, and at least one representative contour can be kept in the mask coreset representing one or more similar contours of the same type (e.g., the contours are considered similar when the measured deviation therebetween is below a predefined deviation threshold).

In some embodiments, the plurality of image coresets are generated at least partially in parallel by multiple processors (such as, e.g., multiple processors as comprised in the processing circuitry 102). The multiple processors can be centralized or distributed. In some cases, they can be hosted/integrated with the mask inspection tool. For instance, the inspection tool may accommodate a queue of N processors, and whenever an aerial image is acquired, it will be sent to the first available processor in the queue to be processed. Similarly, the next acquired image will be sent to the next idle processor in the queue. In such ways, the image acquisition and coreset construction can be performed in parallel. The coreset construction for different images can also be performed in parallel. Once an image coreset is created, it can be sent to a specific processor (such as, e.g., a processor comprised in the processing circuitry 103) configured for merging/unifying all image coresets and generating a mask coreset. The specific processor can be located together or separately from the multiple processors. By way of example, the specific processor can be a separate processor located in the inspection tool, or a processor located in a separate server from the tool.

FIG. 11 shows a schematic illustration of mask coreset generation based on image coresets in accordance with certain embodiments of the presently disclosed subject matter.

Multiple aerial images (e.g., N single images/frames 1102) are sequentially acquired by a mask inspection tool, each capturing a respective portion of a mask. For each single image, upon acquisition by the tool, it can be sent to a processor for image processing and coreset construction as described above with reference to FIGS. 2-4. In particular, a group of contours are extracted corresponding to a group of FOIs from the plurality of printable features from a single image. The number of contours derived from a single image can be typically in the order of thousands (i.e., O(1K)). Upon generation of an image coreset 1104, the magnitude of representative contours in the coreset can be drastically reduced to the order of tens (i.e., O(10)). Since the searching for reference contours and the deviation measurement for each given contour in the group are performed with respect to the representative contours in the image coreset, rather than with respect to all remaining contours in the group of contours, the construction and usage of an image coreset significantly improve the computation efficiency.

When the N image coresets 1104 are generated, respectively corresponding to the N single images 1102, they are sent to be unified/merged to a mask coreset. In some cases, the N image coresets can be sent together to a specific processor for coreset unification 1106. In some other cases, in particular in cases of parallel processing, each image coreset can be sent separately upon their respective generation. By way of example, upon receiving a first image coreset sent by a first processor, the specific processor can store it. When receiving the second image coreset sent by the second processor, the specific processor can start to merge the two image coresets, while waiting for receiving further coresets. For instance, assume the first image coreset is similar to the coreset example as illustrated in FIG. 10, which comprises five families #1-#5. For each representative contour from the second image coreset, the process as described with reference to blocks 304-312 of FIG. 3 can be performed with respect to the first image coreset, so as to integrate the two image coresets to an intermediate coreset.

For instance, starting from the first representative contour in the second image coreset, a search can be performed in the first image coreset for reference contours, and if a reference contour is found, a deviation can be measured between the first representative contour and the reference contour to determine whether to add the first representative contour into the first image coreset, or there is already a representation thereof, similarly as described with reference to blocks 304-312 of FIG. 3.

The same process can be repeated whenever a new image coreset is received from a respective processor, where the process of blocks 304-312 of FIG. 3 can be performed with respect to the intermediate coreset. Eventually, once all N image coresets are received and processed, an overall mask coreset can be generated. The mask coreset can comprise one or more families, where each family comprises at least one representative contour representing similar contours of a respective type from all N images.

It is to be noted that the families in an image coreset and the families in the mask coreset are not necessarily the same, in terms of the number of families, the number of representative contours in each family, as well as the number of contours/instances represented by each family. For instance, a first image coreset may comprise families A, B, C, and D, where D may be temporarily indicated as abnormal/defective due to a single instance represented thereby, and a second image coreset may comprise families A, D, E and F. After merging of the two image coresets by contour comparison, the mask coreset can include families A-F, where the count of instances represented by A is updated as a total of instances from the two image coresets, so is for D. In addition, D is updated to be indicated as a normal family, since it is associated with a count of two instances instead of a single instance. It could also be the case where the two image coresets both comprise families A-D, and after merging, the mask coreset also comprises families A-D, where each family is associated with a total count of instances represented in the two image coresets. In some cases, for purpose of differentiating the families in the image coreset and the families in the mask coreset after merging, the families in the image coreset can also be referred to as image-level families, while the families in the mask coreset can be referred to as mask-level families.

The magnitude of all representative contours from the N image coresets can be in the order of millions or tens of millions (i.e., O(10M)). After the merging and unification, the overall mask coreset can comprise representative contours in the order of thousands (i.e., O(1K)), among which the unique/abnormal contours can be in the order of tens (i.e., O(10)). The unique contours correspond to features that will be reported as defect candidates for edge displacement errors on the mask.

Figure 12:
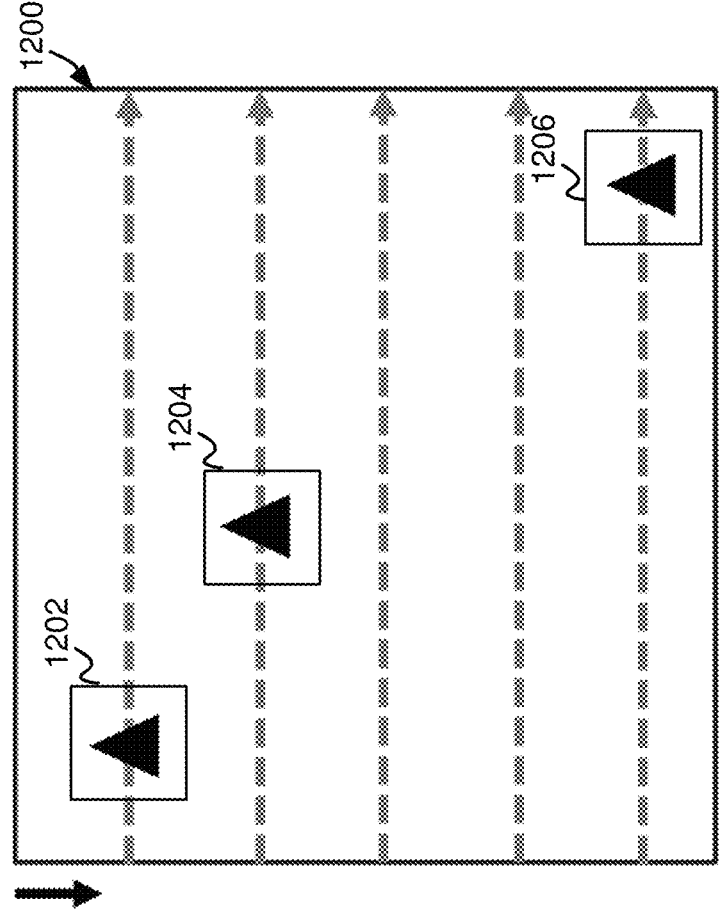
FIG. 12 shows a schematic illustration of false alarm reduction for mask inspection in accordance with certain embodiments of the presently disclosed subject matter.

In addition to computation efficiency, the proposed coreset-based mask inspection can also effectively reduce false alarms detected on the entire mask. This is enabled by the merging and unification of the multiple image coresets, thus allowing to share contour statistics across the whole mask. FIG. 12 shows a schematic illustration of false alarm reduction for mask inspection in accordance with certain embodiments of the presently disclosed subject matter.

During inspection, the mask holder and the detector of the mask inspection tool can be moved in opposite directions to each other during the exposure (or one of them can move at a step size relative to the other), and the mask can be scanned step-by-step along swaths of the mask by the inspection tool, where the inspection tool images a part/portion (within a swath) of the mask at a time. The swaths are laid down in parallel rows/columns contiguous to one another. In the present illustration 1200, the inspection tool can scan a mask along a swath from left to right, then switch to the next swath and scan it, e.g., from right to left, in a similar manner, and so on and so forth, until the entire mask is scanned. A plurality of aerial images of the mask can be sequentially obtained, each representative of a respective part of the mask.

When inspecting each aerial image alone, in some cases, there may be false alarms in the detected defect candidates due to relatively low statistics and/or the existence of unique structural features in the aerial image. By way of example, there may be one structural feature with a unique shape of contour in the aerial image which does not have a reference contour that has a similar shape thereto. In such cases, the inspection process may find no reference for this structural feature, thus reporting it as a defect, or, alternatively, it may use reference contours which are actually not that similar to the feature for comparison, thus also reporting it as a defect. In such cases, these reported defects are false alarms, since they actually represent existence of unique structural elements rather than real defects. In some cases, another instance of such a unique structural element may appear in some of the subsequent images. An example of such cases is illustrated in FIG. 12.

Assume during the inspection along the first swath, an aerial image 1202 capturing a portion of the mask is acquired. Through the image processing and coreset construction process as described with respect to blocks 206, 208, and 210, an image coreset for image 1202 is created, in which one family is indicated as a unique family as it comprises a contour (exemplified in a triangle shape in the figure) which appeared only once in the entire image. Without the presently disclosed solution, each image is independently processed, and the defect detection result thereof is reported irrespective of information of other images and the detection results thereof. In such cases, the contour of the triangle would be detected as a defect due to its uniqueness from the other contours and its rare appearance.

However, as the inspection continues, during the inspection along a later swath, it is discovered that an aerial image 1204 captures the same unique contour (i.e., the image coreset for image 1204 also comprises a unique family comprising a similar contour which appeared only once in that image). Similarly, another image 1206 was acquired during the inspection of the last swath which also captures a similar contour.

When merging the image coresets of all the aerial images across the mask, all the contour information and statistics at image level can be centrally shared and compared. In the present example, after merging it may be found that the unique family comprises a contour whose count of appearances in the entire mask is actually three, rather than one. Depending on the detection threshold (e.g., the number of appearances of a feature on the mask, which is represented by the number of contours of the feature represented by the unique family in the mask coreset), such contour and the corresponding feature may be understood as a false alarm indicative of the presence of a unique structural feature, rather than a defect. In such cases, the indication of the family that comprise a representative contour of the triangle shape will be updated from abnormal/unique to normal.

According to certain embodiments, for a family in the mask coreset that comprises at least one representative contour indicated as abnormal, one or more similar contours of a respective type represented by the at least one representative contour can be identified, and one or more FOIs corresponding to the one or more similar contours of the respective type can be reported as one or more defect candidates. In some cases, for purposes of reporting, a defect map of the mask can be provided, indicative of the presence of the one or more defect candidates on the mask and locations thereof.

In some embodiments, optionally, upon presence of defect candidates and/or further review of the candidates so as to ascertain whether they are indeed true defects, it can be determined how to respond to any defects, e.g., by evaluating their printability, or evaluating whether these defects, upon being printed, will affect the functionality of a semiconductor specimen manufactured using the mask. By way of example, the evaluation can include estimating variations of a printable structural element/feature that is associated with a defect when being printed on the semiconductor specimen. By way of example, the possible treatment operations in response to presence of defects can include: repairing the mask, defining the mask as a faulty mask, defining the mask as functional, generating a repair indication of the mask, and the like. For instance, if these estimated variations are not acceptable, then the mask can be sent to the mask shop to be repaired or rejected.

Additionally, in some embodiments, at least one of the following output/indications, or any combination thereof can be provided: (i) providing a qualification criteria for a mask to be shipped out of a mask shop; (ii) providing input to a mask generation process; (iii) providing input to a semiconductor specimen manufacturing process; (iv) providing input to a simulation model used in a lithographic process; (v) providing correction maps for a lithography tool; and (vi) identifying areas on the mask that are characterized by feature parameter variations which are larger than expected.

In some embodiments, the mask coreset generated for the entire mask is usable (214) as a mask coreset model for subsequent inspection of one or more masks (e.g., either the same mask or one or more new masks). By way of example, the mask coreset can be used as a coreset model, and inspection methods such as, e.g., die to history, die to model, etc., can be used to inspect the one or more masks based on the mask coreset. For instance, for new masks having similar design as the previous mask, once a group of contours are extracted for each image of a new mask (as described with reference to block 208), it is possible to save the efforts of creating an image coreset, and, instead, to compare each contour with respect to the previously created coreset model, in a similar manner as described with reference to FIGS. 3 and 4.

It is to be noted that the mask that is applicable to the presently disclosed inspection method can be any kind of mask that may suffer from the type of defect of edge displacement as described herein, including but not limited to memory masks and/or logic masks, and/or Arf masks and/or EUV masks, etc. The present disclosure is not limited to a specific type or functionality of the masks to be inspected.

For exemplary and illustrative purposes, certain embodiments and/or examples of the presently disclosed subject matter herein are described with respect to structural features with specific types/shapes, and/or specific edge displacements. This is by no means intended to limit the present disclosure in any way. It is appreciated that the proposed methods and systems can be applied to other types/shapes of structural elements with various kinds of edge displacements.

According to certain embodiments, the mask inspection process as described above with reference to FIGS. 2, 3, and 4 can be included as part of an inspection recipe usable by system 101 and/or the inspection tool 120 for online mask inspection in runtime. Therefore, the presently disclosed subject matter also includes a system and method for generating an inspection recipe during a recipe setup phase, where the recipe comprises the steps as described with reference to FIGS. 2, 3, and 4 (and various embodiments thereof). It is to be noted that the term "inspection recipe" should be expansively construed to cover any recipe that can be used by an inspection tool for performing operations related to any kind of mask inspection including the embodiments as described above.

It is to be noted that examples illustrated in the present disclosure, such as, e.g., the mask inspection tool architectures and configurations, the mask layouts, the exemplified structural features, the specific ways of contour extraction, coreset construction, and measurement of the deviation as described above, etc., are illustrated for exemplary purposes, and should not be regarded as limiting the present disclosure in any way. Other appropriate examples/implementations can be used in addition to, or in lieu of the above.

Among advantages of certain embodiments of the mask inspection process as described herein is the capability of detecting a specific type of defect (i.e., edge displacement) with respect to structural features on a mask. The proposed process is designed in particular for a single-die mask where there is no reference die usable for die-to-die comparison. In addition, the proposed process is also applicable for inspecting the non-die areas, such as the scribe region and periphery region in both single-die masks and multi-die masks, as well as the die area for multi-die masks, when needed.

Among further advantages of certain embodiments of the mask inspection process as described herein is that the proposed inspection process does not require image acquisition from different modalities for the purpose of providing reference images which may be time-consuming. It also does not require acquisition of the design data of the mask (which in many cases is not available) or simulation based on the design data which tend to be inaccurate. The proposed process utilizes specific processing of an aerial image to provide references within the image itself, which has proved to have improved accuracy and sensitivity for defect detection in advanced process control of the mask features.

Among further advantages of certain embodiments of the mask inspection process as described herein is that, by creating an image coreset at image level, and performing, for each given contour from a group of contours extracted from the image, the searching for reference contours and deviation measurement in the image coreset (where the magnitude of representative contours in the coreset is in the order of tens (i.e., $O(10)$)), rather performing such with respect to all remaining contours in the group of contours (where the magnitude of contours from a single image is typically in the order of thousands (i.e., $O(1K)$)), the computation efficiency of the inspection system can be significantly increased, thereby improving system throughput (TpT).

Among further advantages of certain embodiments of the mask inspection process as described herein is that the merging of the plurality of image coresets enables to share contour statistics among the plurality of aerial images across the mask, which allows to reduce false alarms in the detection result, as compared to processing each aerial image independently. This can further enable lowering detection threshold, and allow a more sensitive scan which can reveal smaller defects and improve detection sensitivity.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components, and circuits have not been described in detail so as not to obscure the presently disclosed subject matter.

Unless specifically stated otherwise, as apparent from the present discussions, it is appreciated that throughout the specification discussions utilizing terms such as "inspecting", "obtaining", "generating", "emulating", "applying", "estimating", "extracting", "creating", "merging", "identifying", "reporting", "initializing", "searching", "determining", "measuring", "adding", "acquiring", "performing", "registering", "calculating", "keeping", "sharing", "allowing", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the mask inspection system, the mask defect detection system, and respective parts thereof disclosed in the present application.

The term "mask" used in this specification is also referred to as "photolithographic mask", or "photomask", or "reticle". Such terms should be construed equivalently and expansively to cover a template holding circuit design (e.g., defining the layout of a specific layer of an integrated circuit) to be patterned on a semiconductor wafer in a photolithography process. By way of example, a mask can be implemented as a fused silica plate covered with a pattern of opaque, transparent, and phase-shifting areas which are projected onto wafers in the lithography process. By way of example, a mask can be an Extreme Ultraviolet (EUV) mask or an Argon Fluoride (ArF) mask. By way of another example, a mask can be a memory mask (usable for fabricating a memory device) or a logic mask (usable for fabricating a logic device).

The term "inspection" or "mask inspection" used in this specification should be expansively construed to cover any operation for assessing the accuracy and integrity of a fabricated photomask with respect to the circuit design and its ability to produce an accurate representation of the circuit design onto the wafer. The inspection can include any kind of operations related to defect detection, defect review and/or defect classification of various types, and/or metrology operations during and/or after the mask fabrication process and/or during the usage of the mask for semiconductor specimen fabrication. Inspection can be provided by using non-destructive inspection tools after fabrication of the mask. By way of non-limiting example, the inspection process can include one or more of the following operations: scanning (in a single or in multiple scans), imaging, sampling, detecting, measuring, classifying and/or other operations provided with regard to the mask or parts thereof, using an inspection tool. Likewise, mask inspection can also be construed to include, for example, generating an inspection recipe(s) and/or other setup operations, prior to the actual inspection of the mask. It is noted that, unless specifically stated otherwise, the term "inspection" or its derivatives used in this specification are not limited with respect to resolution or size of an inspection area. A variety of non-destructive inspection tools includes, by way of non-limiting example, optical inspection tools, scanning electron microscopes, atomic force microscopes, etc.

The term "metrology operation" used in this specification should be expansively construed to cover any metrology operation procedure used to extract metrology information relating to one or more structural elements on a mask. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed for example, by employing image-processing techniques. Note that, unless specifically stated otherwise, the term "metrology" or derivatives thereof used in this specification are not limited with respect to measurement technology, measurement resolution, or size of inspection area.

The term "specimen" used in this specification should be expansively construed to cover any kind of wafers, related structures, combinations and/or parts thereof used for manufacturing semiconductor integrated circuits, magnetic heads, flat panel displays, and other semiconductor-fabricated articles.

The term "defect" used in this specification should be expansively construed to cover any kind of abnormality or undesirable feature formed on a mask. A defect in some cases can refer to a real defect or a defect of interest (DOI) which, when printed on the wafer, has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "defect candidate" used in this specification should be expansively construed to cover a suspected defect location on the mask which is detected to have relatively high probability of being a defect of interest (DOI). Therefore, a DOI candidate, upon being reviewed/tested, may actually be a DOI, or, in some other cases, it may be a nuisances, or random noise that can be caused by different variations (e.g., process variation, color variation, mechanical and electrical variations, etc.) during inspection.

The term "image(s)" or "image data" used in the specification should be expansively construed to cover any original images/frames of the mask captured by a mask inspection tool, derivatives of the captured images/frames obtained by various pre-processing stages, and/or computer-generated synthetic images. It is to be noted that in some cases the image data referred to herein can include, in addition to images (e.g., captured images, processed images, etc.), numeric data associated with the images (e.g., metadata, hand-crafted attributes, etc.). It is further noted that the image data relates to a target layer of a semiconductor device to be printed on the wafer.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of inspecting a mask usable for fabricating a semiconductor specimen, the system comprising one or more processing circuitries configured to:

obtain a plurality of aerial images each capturing a respective portion of a mask;

generate a plurality of image coresets corresponding to the plurality of aerial images, the generating comprising, for each given aerial image:

i) applying a printing threshold on the given aerial image to obtain a binary image representative of a plurality of printable features thereof;

ii) extracting a contour for each feature of interest (FOI) of a group of FOIs from the plurality of printable features, and generating a descriptor characterizing the contour, giving rise to a group of contours corresponding to the group of FOIs and associated with respective descriptors; and iii) creating an image coreset for the group of contours based on the respective descriptors thereof, the image coreset comprising one or more families each comprising at least one representative contour representing one or more similar contours of a respective type from the group of contours; and merge the plurality of image coresets to obtain a mask coreset, wherein each family in the mask coreset comprises at least one representative contour representing one or more similar contours of a respective type from the plurality of aerial images, the at least one representative contour being indicated as normal or abnormal based on a number of the one or more similar contours of the respective type from the plurality of aerial images.

2. The computerized system according to claim 1, wherein for a family in the mask coreset that comprises at least one representative contour indicated as abnormal, the one or more processing circuitries are further configured to identify one or more similar contours of a respective type represented by the at least one representative contour, and report one or more FOIs corresponding to the one or more similar contours of the respective type as one or more defect candidates.

3. The computerized system according to claim 2, wherein a defect candidate from the one or more defect candidates represents an edge displacement error indicative of a relatively substantial deviation of a contour of a FOI from an expected position thereof.

4. The computerized system according to claim 1, wherein each family in the image coreset is associated with an indication whether the at least one representative contour thereof is indicated as normal or abnormal at an image level, the indication obtained based on the number of the one or more similar contours of the respective type from the group of contours.

5. The computerized system according to claim 1, wherein the image coreset is a subset of representative contours that approximates a distribution of the group of contours.

6. The computerized system according to claim 5, wherein the one or more processing circuitries are configured to create the image coreset by:

initializing an image coreset;

sequentially, for each given contour in the group of contours:

searching in the image coreset for one or more reference contours based on a similarity measure applied on the descriptors thereof;

in response to the one or more reference contours being identified, measuring a deviation between the given contour and each of the one or more reference contours; and determining whether to add the given contour to a family in the image coreset based on the measured deviation.

7. The computerized system according to claim 6, wherein in response to the one or more reference contours not being found, the one or more processing circuitries are configured to add the given contour to a new family in the image coreset.

8. The computerized system according to claim 6, wherein the one or more processing circuitries are configured to measure the deviation between the given contour and each of the one or more reference contours by:

registering the given contour respectively with the one or more reference contours, giving rise to one or more registered pairs of contours;

measuring distances between corresponding points of each registered pair of contours; and calculating the deviation based on the measured distances.

9. The computerized system according to claim 1, wherein the one or more processing circuitries are configured to merge the plurality of image coresets by measuring deviation between representative contours from different image coresets of the plurality of image coresets, and keep at least one representative contour in the mask coreset representing one or more similar contours of the same type.

10. The computerized system according to claim 1, wherein the plurality of image coresets are generated at least partially in parallel by multiple processors, and sent to a specific processor to be merged.

11. The computerized system according to claim 1, wherein the descriptor of a contour is based on one or more of: an area formed by the contour, width of the area, height of the area, the number of pixels along the contour, a chain code, a center of gravity, and polar coordinates of the contour.

12. The computerized system according to claim 1, wherein the plurality of aerial images are sequentially acquired by an actinic mask inspection tool configured to emulate optical configuration of a lithographic tool.

13. The computerized system according to claim 1, wherein the merging of the plurality of image coresets enables to share contour statistics among the plurality of aerial images across the mask, thereby allowing to reduce false alarms and improving detection sensitivity.

14. The computerized system according to claim 1, wherein the mask coreset is usable as a mask coreset model for subsequent inspection of one or more masks.

15. The computerized system according to claim 1, wherein the plurality of aerial images are captured for a single-die mask or a multi-die mask.

16. A computerized method of inspecting a mask usable for fabricating a semiconductor specimen, the method comprising:

obtaining a plurality of aerial images each capturing a respective portion of a mask;

generating a plurality of image coresets corresponding to the plurality of aerial images, the generating comprising, for each given aerial image:

i) applying a printing threshold on the given aerial image to obtain a binary image representative of a plurality of printable features thereof;

ii) extracting a contour for each feature of interest (FOI) of a group of FOIs from the plurality of printable features, and generating a descriptor characterizing the contour, giving rise to a group of contours corresponding to the group of FOIs and associated with respective descriptors; and iii) creating an image coreset for the group of contours based on the respective descriptors thereof, the image coreset comprising one or more families each comprising at least one representative contour representing one or more similar contours of a respective type from the group of contours; and merging the plurality of image coresets to obtain a mask coreset, wherein each family in the mask coreset comprises at least one representative contour representing one or more similar contours of a respective type from the plurality of aerial images, the at least one representative contour being indicated as normal or abnormal based on a number of the one or more similar contours of the respective type from the plurality of aerial images.

17. The computerized method according to claim 16, wherein the image coreset is a subset of representative contours that approximates a distribution of the group of contours.

18. The computerized method according to claim 17, wherein the image coreset is created by:

initializing an image coreset;

sequentially, for each given contour in the group of contours:

searching in the image coreset for one or more reference contours based on a similarity measure applied on the descriptors thereof;

in response to the one or more reference contours being identified, measuring a deviation between the given contour and each of the one or more reference contours; and determining whether to add the given contour to a family in the coreset based on the measured deviation.

19. The computerized method according to claim 16, wherein the merging of the plurality of image coresets comprises measuring deviation between representative contours from different image coresets of the plurality of image coresets, and keeping at least one representative contour in the mask coreset representing one or more similar contours of a same type.

20. A non-transitory computer readable storage medium tangibly embodying a program of instructions that, when executed by a computer, cause the computer to perform a method of inspecting a mask usable for fabricating a semiconductor specimen, the method comprising:

obtaining a plurality of aerial images each capturing a respective portion of a mask;

generating a plurality of image coresets corresponding to the plurality of aerial images, the generating comprising, for each given aerial image:

i) applying a printing threshold on the given aerial image to obtain a binary image representative of a plurality of printable features thereof;

ii) extracting a contour for each feature of interest (FOI) of a group of FOIs from the plurality of printable features, and generating a descriptor characterizing the contour, giving rise to a group of contours corresponding to the group of FOIs and associated with respective descriptors; and iii) creating an image coreset for the group of contours based on the respective descriptors thereof, the image coreset comprising one or more families each comprising at least one representative contour representing one or more similar contours of a respective type from the group of contours; and merging the plurality of image coresets to obtain a mask coreset, wherein each family in the mask coreset comprises at least one representative contour representing one or more similar contours of a respective type from the plurality of aerial images, the at least one representative contour being indicated as normal or abnormal based on a number of one or more similar contours of the respective type from the plurality of aerial images.

* * * * *